United States Patent
Monani et al.

(10) Patent No.: US 12,441,998 B2
(45) Date of Patent: Oct. 14, 2025

(54) SLC2A1 LNCRNA AS A BIOLOGIC AND RELATED TREATMENTS AND METHODS

(71) Applicant: The Trustees of Columbia University in the City of New York, New York, NY (US)

(72) Inventors: Umrao Monani, Oradell, NJ (US); Maoxue Tang, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 885 days.

(21) Appl. No.: 16/755,484

(22) PCT Filed: Oct. 12, 2018

(86) PCT No.: PCT/US2018/055599
§ 371 (c)(1),
(2) Date: Apr. 10, 2020

(87) PCT Pub. No.: WO2019/075320
PCT Pub. Date: Apr. 18, 2019

(65) Prior Publication Data
US 2021/0222167 A1    Jul. 22, 2021

Related U.S. Application Data

(60) Provisional application No. 62/571,667, filed on Oct. 12, 2017.

(51) Int. Cl.
C12N 15/113    (2010.01)
A61K 35/76    (2015.01)
A61P 3/08    (2006.01)

(52) U.S. Cl.
CPC ............ *C12N 15/113* (2013.01); *A61K 35/76* (2013.01); *A61P 3/08* (2018.01); *C12N 2310/111* (2013.01)

(58) Field of Classification Search
CPC .......... C12N 15/113; A61K 35/76; A61P 3/08
See application file for complete search history.

(56) References Cited

U.S. PATENT DOCUMENTS 4,596,556 A    6/1986    Morrow et al.
4,790,824 A    12/1988    Morrow et al.
(Continued)

FOREIGN PATENT DOCUMENTS

WO    1998010088 A1    3/1998

OTHER PUBLICATIONS

Gray et al., Optimizing Promoters for Recombinant Adeno-Associated Virus-Mediated Gene Expression in the Peripheral and Central Nervous System Using Self-Complementary Vectors, 2011, Human Gene Therapy, 22, 1143-1153. (Year: 2011).*
(Continued)

*Primary Examiner* — Soren Harward
*Assistant Examiner* — Keyur A Vyas
(74) *Attorney, Agent, or Firm* — LEASON ELLIS LLP

(57) ABSTRACT

The present invention relates to a novel antisense transcript to the human SLC2A1 (Glut1) gene, variants and fragments thereof. This antisense transcript can be used to modulate Glut1 expression and serve to restore Glut1, and as a therapeutic for treating or preventing Glut 1 deficiency syndrome, or other Glut1 related conditions including certain cancers, diabetes, Alzheimer's disease, and retinitis pigmentosa.

3 Claims, 16 Drawing Sheets
Specification includes a Sequence Listing.

(56) References Cited

U.S. PATENT DOCUMENTS

| | | |
|---|---|---|
| 4,941,880 A | 7/1990 | Burns |
| 5,064,413 A | 11/1991 | McKinnon et al. |
| 5,312,335 A | 5/1994 | McKinnon et al. |
| 5,383,851 A | 1/1995 | McKinnon, Jr. et al. |
| 5,399,163 A | 3/1995 | Peterson et al. |
| 5,478,745 A | 12/1995 | Samulski et al. |
| 5,552,157 A | 9/1996 | Yagi et al. |
| 5,565,213 A | 10/1996 | Nakamori et al. |
| 5,567,434 A | 10/1996 | Szoka, Jr. |
| 5,656,016 A | 8/1997 | Ogden |
| 5,697,899 A | 12/1997 | Hillman et al. |
| 5,738,868 A | 4/1998 | Shinkarenko |
| 5,741,516 A | 4/1998 | Webb et al. |
| 5,770,219 A | 6/1998 | Chiang et al. |
| 5,779,708 A | 7/1998 | Wu |
| 5,783,208 A | 7/1998 | Venkateshwaran et al. |
| 5,795,587 A | 8/1998 | Gao et al. |
| 5,797,898 A | 8/1998 | Santini, Jr. et al. |
| 6,001,650 A | 12/1999 | Colosi |
| 6,096,002 A | 8/2000 | Landau |
| 6,156,303 A | 12/2000 | Russell et al. |
| 6,620,135 B1 | 9/2003 | Weston et al. |
| 2003/0138772 A1 | 7/2003 | Gao et al. |
| 2006/0031949 A1* | 2/2006 | Shen .............. C12N 15/111 435/325 |
| 2007/0015163 A1 | 1/2007 | Isogai et al. |
| 2007/0083334 A1 | 4/2007 | Mintz et al. |
| 2013/0195801 A1* | 8/2013 | Gao .................. A61P 25/00 435/325 |
| 2014/0335054 A1 | 11/2014 | Gao et al. |
| 2015/0159218 A1 | 6/2015 | Overgaard et al. |
| 2018/0042991 A1 | 2/2018 | De Vivo et al. |

OTHER PUBLICATIONS

Crooke et al., Mechanisms of Antisense Drug Action, an Introduction, Chapter 1, in Antisense Drug Technology, 2nd ed. Ed. by Stanley Crooke, 2008, p. 3-46 (Year: 2008).*

Zincarelli et al., Analysis of AAV Serotypes 1-9 Mediated Gene Expression and Tropism in Mice After Systemic Injection, 2008, Molecular Therapy, 16, 1073-1080. (Year: 2008).*

Szablewski, Expression of glucose transporters in cancers, 2013, Biochimica et Biophysica Acta, 1835, 164-169. (Year: 2013).*

Asokan, The AAV Vector Toolkit: Poised at the Clinical Crossroads 2012, Molecular Therapy, 20, p. 699-708). (Year: 2012).*

Tang et al. "Brain microvasculature defects and Glut1 deficiency syndrome averted by early repletion of the glucose transporter-1 protein," Nat Commun, Jan. 20, 2017 (Jan. 20, 2017), vol. 8, pp. 1-15. entire document.

Klepper and Leiendecker (Apr. 1, 2013) Glut1 deficiency syndrome and novel ketogenic diets. J Child Neurol. 28:1045-8.

Bélanger et al. (Dec. 7, 2011) Brain energy metabolism: focus on astrocyte-neuron metabolic cooperation. Cell Metab. 14:724-38.

De Giorgis and Veggiotti (Apr. 25, 2013) GLUT1 deficiency syndrome 2013: current state of the art. Seizure. 22:803-11.

De Vivo et al. (Sep. 5, 1991). Defective glucose transport across the blood-brain barrier as a cause of persistent hypoglycorrhachia, seizures, and developmental delay. N. Engl. J. Med., 325, 703-709.

Gao (Apr. 11, 2016) Progress and Perspectives on Targeting Nanoparticles for Brain Drug Delivery. Acta Pharmaceutica Sinica B 6(4);268-286.

Johnsson et al. (Mar. 2014) Evolutionary conservation of long non-coding RNAs; sequence, structure, function. Biochim Biophys Acta. 1840:1063-71.

Kim et al (May 13, 2010) Widespread transcription at neuronal activity-regulated enhancers. Nature. 465:182-7.

Marques and Ponting (2009) Catalogues of mammalian long noncoding RNAs: modest conservation and incompleteness. Genome Biol. 10:R124. Received Aug. 8, 2009.

Monani et al. (2000) The human centromeric survival motor neuron gene (SMN2) rescues embryonic lethality in Smn(-/-) mice and results in a mouse with spinal muscular atrophy. Hum Mol Genet. 9:333-9, Received Dec. 2, 1999.

Ørom et al. (Oct. 1, 2010) Long noncoding RNAs with enhancer-like function in human cells. Cell. 143:46-58.

Pascual and Ronen (Nov. 2015) Glucose Transporter Type I Deficiency (G1D) at 25 (1990-2015): Presumptions, Facts, and the Lives of Persons With This Rare Disease. Pediatr Neurol. 53:379-93.

Pellerin et al. (Mar. 1998) Expression of monocarboxylate transporter mRNAs in mouse brain: support for a distinct role of lactate as an energy substrate for the neonatal vs. adult brain. Proc Natl Acad Sci U S A. 95:3990-5.

Ravasi et al. (Jan. 2006) Experimental validation of the regulated expression of large numbers of non-coding RNAs from the mouse genome. Genome Res. 16:11-9.

Wang et al. (Feb. 15, 2006) A mouse model for Glut-1 haploinsufficiency. Hum Mol Genet. 15:1169-79.

Halley P, Khorkova O, Wahlestedt C, "Drug Discov Today Ther Strateg.", vol. 10/Issue 3 pp. e119-e125, Jan. 7, 2015.

Weiner et al., L. A. (1999). Excipient toxicity and safety. CRC Press. 1-87 pages.

Gossen et al., (1995). Transcriptional activation by tetracyclines in mammalian cells. Science, 268(5218), 1766-1769.

Klump et al., (2001). Retroviral vector-mediated expression of HoxB4 in hematopoietic cells using a novel coexpression strategy. Gene therapy, 8(10), 811-817.

Fisher et al., (1996). Transduction with recombinant adeno-associated virus for gene therapy is limited by leading-strand synthesis. Journal of virology, 70(1), 520-532.

Boshart et al., (1985). A very strong enhancer is located upstream of an immediate early gene of human cytomegalovirus. cell, 41(2), 521-530.

Furler et al., (2001). Recombinant AAV vectors containing the foot and mouth disease virus 2A sequence confer efficient bicistronic gene expression in cultured cells and rat substantia nigra neurons. Gene therapy, 8(11), 864-873.

Halpin et al., (1999). Self-processing 2A-polyproteins—a system for co-ordinate expression of multiple proteins in transgenic plants. The Plant Journal, 17(4), 453-459.

Harvey et al., (1998). Inducible control of gene expression: prospects for gene therapy. Current opinion in chemical biology, 2(4), 512-518.

Wang et al., (1997). Positive and negative regulation of gene expression in eukaryotic cells with an inducible transcriptional regulator. Gene therapy, 4(5), 432-441.

Magari et al., (1997). Pharmacologic control of a humanized gene therapy system implanted into nude mice. The Journal of clinical investigation, 100(11), 2865-2872.

Ryan et al., (1994). Foot-and-mouth disease virus 2A oligopeptide mediated cleavage of an artificial polyprotein. The EMBO journal, 13(4), 928-933.

Piccioli et al., (1995). Neuroantibodies: ectopic expression of a recombinant anti-substance P antibody in the central nervous system of transgenic mice. Neuron, 15(2), 373-384.

Piccioli et al., (1991). Neuroantibodies: molecular cloning of a monoclonal antibody against substance P for expression in the central nervous system. Proceedings of the National Academy of Sciences, 88(13), 5611-5615.

Mattion et al., (1996). Foot-and-mouth disease virus 2A protease mediates cleavage in attenuated Sabin 3 poliovirus vectors engineered for delivery of foreign antigens. Journal of Virology, 70(11), 8124-8127.

Gossen et al., (1992). Tight control of gene expression in mammalian cells by tetracycline-responsive promoters. Proceedings of the National Academy of Sciences, 89(12), 5547-5551.

No et al., (1996). Ecdysone-inducible gene expression in mammalian cells and transgenic mice. Proceedings of the National Academy of Sciences, 93(8), 3346-3351.

De Felipe et al., (1999). Use of the 2A sequence from foot-and-mouth disease virus in the generation of retroviral vectors for gene therapy. Gene therapy, 6(2), 198-208.

De Felipe et al., (2000). Tricistronic and tetracistronic retroviral vectors for gene transfer. Human gene therapy, 11 (13), 1921-1931.

(56) References Cited

OTHER PUBLICATIONS

Brockdorff et al., (1992). The product of the mouse Xist gene is a 15 kb inactive X-specific transcript containing no conserved ORF and located in the nucleus. Cell, 71(3), 515-526.

Brockmann, (2009). The expanding phenotype of GLUT1-deficiency syndrome. Brain and Development, 31(7), 545-552.

Wang et al., (1997). Ligand-inducible and liver-specific target gene expression in transgenic mice. Nature biotechnology, 15(3), 239-243.

Andersen et al., (1993). Herpesvirus-mediated gene delivery into the rat brain: specificity and efficiency of the neuron-specific enolase promoter. Cellular and Molecular Neurobiology, 13, 503-515.

Gao et al., (2004). Clades of Adeno-associated viruses are widely disseminated in human tissues. Journal of virology, 78(12), 6381-6388.

Gao et al., (2003). Adeno-associated viruses undergo substantial evolution in primates during natural infections. Proceedings of the National Academy of Sciences, 100(10), 6081-6086.

Nagano et al., (2008). The Air noncoding RNA epigenetically silences transcription by targeting G9a to chromatin. Science, 322(5908), 1717-1720.

Wright et al., (2005). Identification of factors that contribute to recombinant AAV2 particle aggregation and methods to prevent its occurrence during vector purification and formulation. Molecular Therapy, 12(1), 171-178.

Arsov et al., (2012). Glucose transporter 1 deficiency in the idiopathic generalized epilepsies. Annals of neurology, 72(5), 807-815.

Kim JK, Monani UR. Augmenting the SMN Protein to Treat Infantile Spinal Muscular Atrophy. Neuron. 2018;97(5):1001-1003. doi:10.1016/j.neuron.2018.02.009.

Kopp F, Mendell JT. (2018) Functional Classification and Experimental Dissection of Long Noncoding RNAs. Cell. 172:393-407.

\* cited by examiner

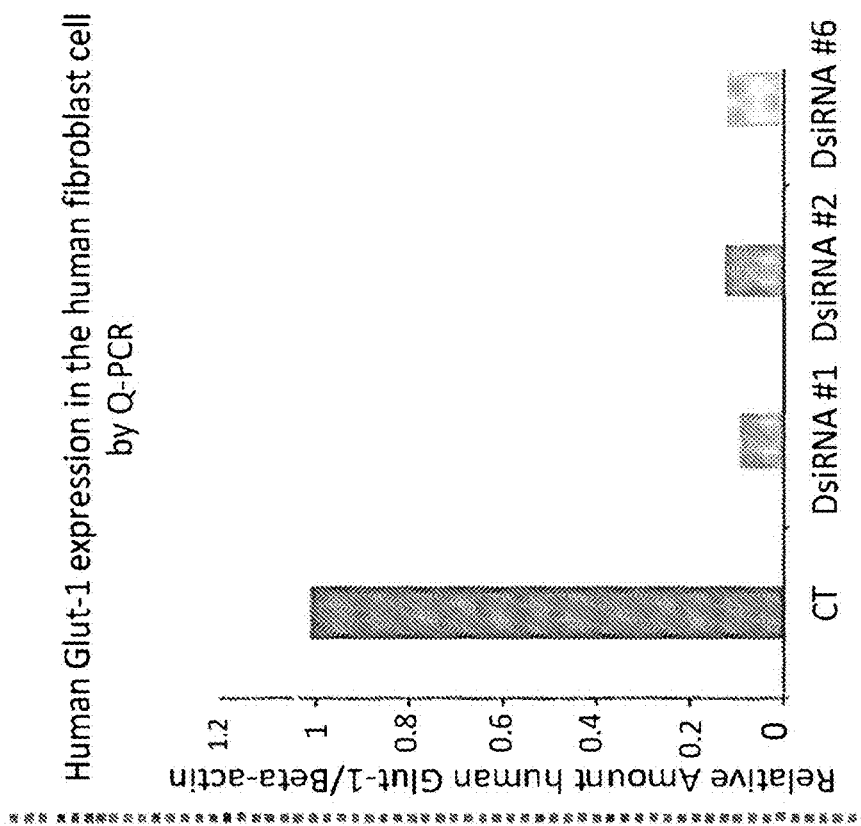
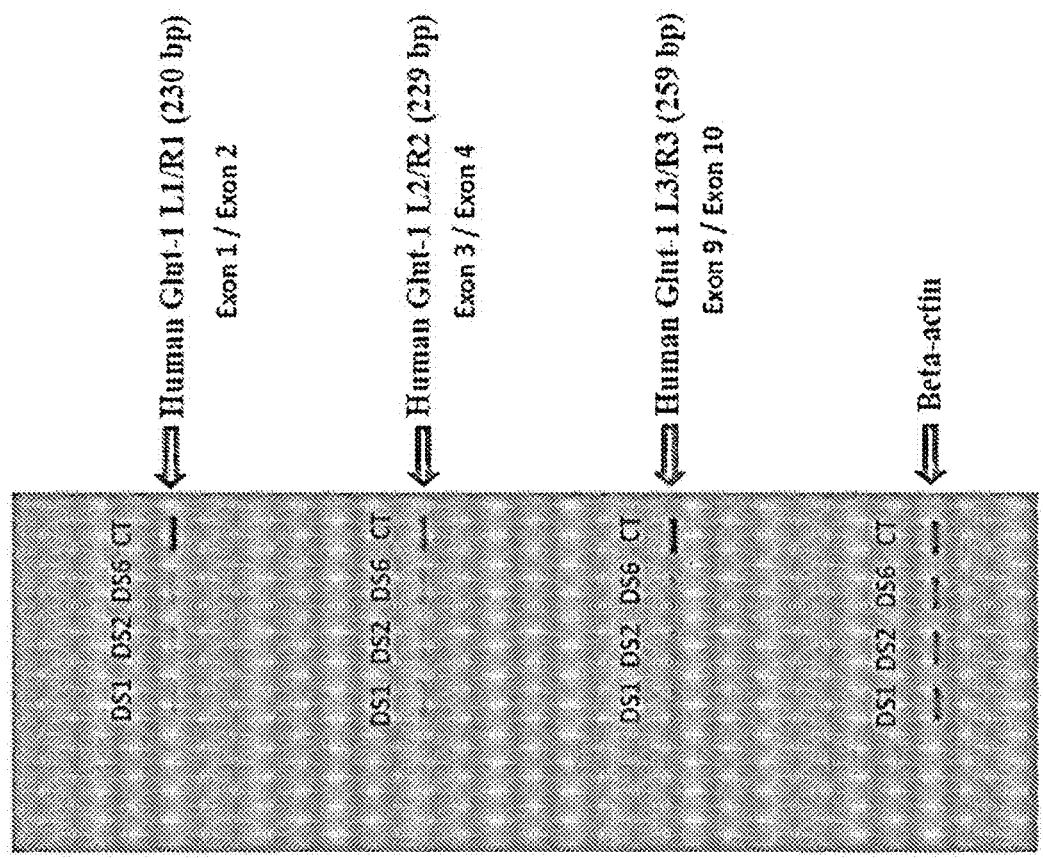
Figure 6B
Figure 6A

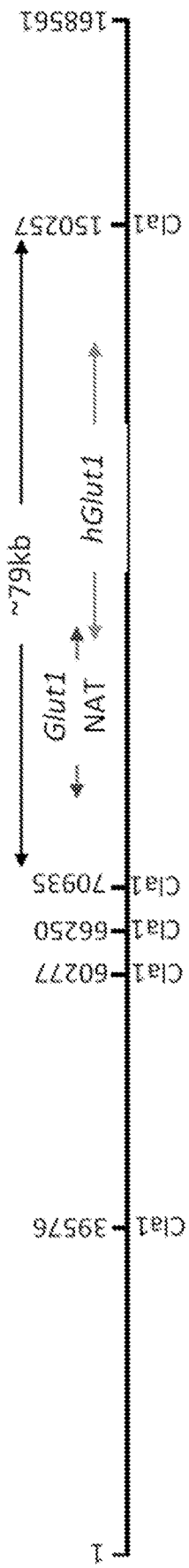
Figure 7A
Figure 7B

SEQUENCE LISTING

```
<160> NUMBER OF SEQ ID NOS: 2

<210> SEQ ID NO 1
<211> LENGTH: 1138
<212> TYPE: DNA
<213> ORGANISM: Homo sapiens

<400> SEQUENCE: 1
```

```
gcctcgctca ggctgccgat cggctcgttc tctctgcgtt gggaccgcgg agggcattcg      60
ctgtgtgact cagggcaagt gtgcgcacct ctctgagcct ccgcggcctt ctctagcaaa     120
atggtggagc cggtacccgg ctgtaaggca agctgggatg cgcggagtag cgggtggaaa     180
gctggactgg agttctcact cggccgctgg gtgacttcgg tgcactaggg atagtaacag     240
taccacctcg tagggttgta gaaagaccaa gtgagttaat atttgtaaag tgtttagaac     300
agcgtctact gcatggaaag tagtatttat ttgttagaga gactccagga ggtcttgccc     360
agggattgac ttctcccttc cctgtctcca cccccacat tcccgtttgt gagccaagcc      420
ttgcttttgc accggccggg ctctcttgcc tggaaatgca tacccatctc aaacctgggc     480
tttaaaatca cctcctctgg gacgccttcc tctacttctc acagttcagg cctgttctgc     540
cccacacagc agaaaatgcc cacgatgcaa taccagagtc tgcatgggac catttcaaca     600
acccttagaa gctgactcag ctgtctcctg gccctgactt ttctaagatg agaggagctg     660
gtaggaacaa tttgggaacc ctcaaaggct gagagtatcc cacccacttc acagatgaag     720
caaactgagg cccagagaag ggaaattact tgcccaagat cacccagcaa gtaagaaaca     780
gagctggaga tgagctcagg ccagcacgga accacgcaaa ctccttctgt aggctttgta     840
aaggattgat gagaaaagca gatggttaag agctctacaa cttctgtgag tttctccacg     900
ttggtcaggc tggcctcgaa ctcccaccct caggtgatcc acctgccttg gcctcctaaa     960
gttctgggat tacaggcatg agccactgca cccaacctga ataatctatt agagtcttta    1020
tctctaagaa gagaaataca tctgaactaa agggtaaaaa atggcatgtt ttaattggta    1080
agtctaaatg caaaacgatg acaataaaat tttaaaggac tgctaaaaaa aaaaaaaa     1138

<210> SEQ ID NO 2
<211> LENGTH: 890
<212> TYPE: DNA
<213> ORGANISM: Homo sapiens

<400> SEQUENCE: 2
gcctcgctca ggctgccgat cggctcgttc tctctgcgtt gggaccgcgg agggcattcg      60
ctgtgtgact cagggcaagt gtgcgcacct ctctgagcct ccgcggcctt ctctagcaaa     120
atggtggagc cggtacccgg ctgtaaggca agctgggatg cgcggagtag cgggtggaaa     180
gctggactgg agttctcact cggccgctgg gtgacttcgg tgcactaggg atagtaacag     240
taccacctcg tagggttgta gaaagaccaa gtgagttaat atttgtaaag tgtttagaac     300
agcgtctact gcatggaaag tagtatttat ttgttagaga gactccagga ggtcttgccc     360
agggattgac ttctcccttc cctgtctcca cccccacat tcccgtttgt gagccaagcc      420
ttgcttttgc accggccggg ctctcttgcc tggaaatgca tacccatctc aaacctgggc     480
tttaaaatca cctcctctgg gacgccttcc tctacttctc acagttcagg cctgttctgc     540
cccacacagc agaaaatgcc cacgatgcaa taccagagtc tgcatgggac catttcaaca     600
acccttagaa gctgactcag ctgtctcctg gccctgactt ttctaagatg agaggagctg     660
gtaggaacaa tttgggaacc ctcaaaggct gagagtatcc cacccacttc acagatgaag     720
caaactgagg cccagagaag ggaaattact tgcccaagat cacccagcaa gtaagaaaca     780
gagctggaga tgagctcagg ccagcacgga accacgcaaa ctccttctgt aggctttgta     840
aaggattgat gagaaaagca gatggttaag agctctacaa cttctgtgag                890
```

SLC2A1 LNCRNA AS A BIOLOGIC AND RELATED TREATMENTS AND METHODS

CROSS REFERENCE TO RELATED APPLICATION

The present application is a U.S. National Phase Application under 35 U.S.C. § 371 of International Patent Application No. PCT/US2018/055599, filed Oct. 12, 2018, which claims priority to U.S. patent application Ser. No. 62/571,667, filed Oct. 12, 2017, each of which are hereby incorporated by reference as if expressly set forth in its entirety herein.

STATEMENT OF GOVERNMENT SUPPORT

This invention was made with government support under grant number NINDS NS057482 awarded by the National Institutes of Health. The government has certain rights in this invention.

FIELD OF THE INVENTION

The present invention relates the discovery of a novel natural antisense transcript or long non-coding RNA to the human SLC2A1 (Glut1) gene and its use to modulate Glut1 expression and serve as a therapeutic for treating or preventing Glut 1 deficiency syndrome, or other Glut1 related conditions including certain cancers, diabetes, Alzheimer's disease, and retinitis pigmentosa.

BACKGROUND OF THE INVENTION

The human cerebrum, despite its modest size (2% of body mass) has a voracious appetite for glucose, devouring 25% of the total amount metabolized by the body (Bélanger et al. 2011). Curbing the supply of this nutrient to the brain has grave consequences for proper cerebral development and function. This is best exemplified by the rare but debilitating infantile-onset brain energy failure syndrome, Glucose Transporter-1 deficiency syndrome (Glut1 DS) (DeGiorgis and Veggiotti 2013). Caused by a heterozygous loss of the SLC2A1 (Glut1) gene and thus a corresponding reduction in the Glut1 protein, Glut1 DS is characterized by intractable infantile-onset seizures, neurodevelopmental delay and a complex movement disorder that combines elements of ataxia, dystonia and spasticity. An expanded phenotype that includes non-epileptic paroxysmal exercise-induced dyskinesia and hemolytic anemia (Brockmann 2012), in conjunction with emerging evidence that Glut1 mutations underlie a significant proportion of the idiopathic generalized epilepsies (Arsoy et al. 2012), suggest that the disease is more prevalent than initially thought and could affect 6000 to 12,000 patients in the United States alone. Thus, it is a significant neurological disorder with correspondingly pronounced health as well as societal costs attached to it.

Although it has been roughly two decades since Glut1 DS was found to result from mutations in the Glut1 gene, little progress has been made in developing an optimal treatment for the disease. The most widely prescribed therapy for patients afflicted with Glut1 DS involves a high-fat, ketogenic diet (DeGiorgis and Veggiotti 2013). Such a diet supplies the brain with an alternate, albeit imperfect energy source—ketone bodies (Klepper and Leiendecker 2013). The ketone bodies provide an alternate source of acetyl COA that can be fed into the Krebs cycle. However, they fail to replenish glycolytic intermediates deriving from glucose. Moreover, entry of the ketone bodies into the parenchyma eventually declines as MCT1 (monocarboxylate transporter-1), the relevant conduit used to deliver these molecules across the blood-brain barrier (BBB), is downregulated during early postnatal development (Pellerin et al. 1998). It is therefore little surprise that the ketogenic diet while effective in managing seizures in patients fails to avert cognitive dysfunction or the movement defects typically associated with Glut1 DS (Pascual and Ronen 2015).

Considering the rather poor therapeutic outcome associated with the ketogenic diet, new methods for modulating and restoring Glut1 in many conditions would be highly desirable.

SUMMARY OF THE INVENTION

The present invention is based at least in part on the discovery of a natural antisense transcript (NAT) or long non-coding RNA (lncRNA) to the human SLC2A1 (Glut1) gene. This NAT or lncRNA regulates expression of the SLC2A1 (Glut1) gene.

In certain embodiments, the present invention provides a nucleic acid comprising SLC2A1-NAT or Glut1-NAT comprising the nucleotide sequence SEQ ID NO: 1.

In certain embodiments, the present invention relates to a nucleic acid comprising SLC2A1-NAT or Glut1-NAT comprising the nucleotide sequence SEQ ID NO: 2.

The SLC2A1-NAT nucleic acids of the invention include those comprising the sequences SEQ ID NOs: 1 and 2 and variants and fragments thereof. The nucleic acids can be RNA or DNA. The DNA can be cDNA.

In certain embodiments, the present invention relates to a pharmaceutical composition comprising a nucleic acid comprising SLC2A1-NAT or Glut1-NAT described herein.

In certain embodiments, the composition can further comprise one or more of pharmaceutically acceptable excipient, ligand, conjugate, vector, lipid, liposome, carrier, adjuvant or diluent.

In yet additional embodiments, the nucleic acid is provided in a recombinant adeno-associated vector (rAAV). In additional embodiments, the rAAV vector further comprises a chicken Beta-actin promoter and wherein the rAAV is capable of crossing the blood-brain barrier (BBB). In yet additional embodiments, the AAV is AAV8 or AAV9.

In certain embodiments, the present invention relates to kits comprising the nucleic acids and compositions described herein.

In further embodiments, the present invention relates to a method of restoring Glut1 transport in the blood brain barrier (BBB) of a subject, comprising administering to the subject a therapeutically effective amount of a SLC2A1-NAT nucleic acid described herein or a pharmaceutical composition comprising a SLC2A1-NAT nucleic acid described herein.

In yet further embodiments, the invention provides for treating Glut1 deficiency syndrome in a subject in need thereof, comprising administering to the subject a therapeutically effective amount of a SLC2A1-NAT nucleic acid described herein or a pharmaceutical composition comprising a SLC2A1-NAT nucleic acid described herein.

In still further embodiments, the present invention provides for a method of alleviating in a subject, at least one of the symptoms associated with Glut1 deficiency syndrome selected from the group consisting of hypoglycorrhachia, acquired microcephaly, ataxic and dystonic motor dysfunction, comprising administering to the subject a therapeutically effective amount of a SLC2A1-NAT nucleic acid described herein or a pharmaceutical composition comprising a SLC2A1-NAT nucleic acid described herein.

In a further embodiment, the present invention provides for a method of treating Glut1 related condition in a subject in need thereof, comprising administering to the subject a therapeutically effective amount of a SLC2A1-NAT nucleic acid described herein or a pharmaceutical composition comprising a SLC2A1-NAT nucleic acid described herein.

The conditions include but are not limited to cancer, diabetes, Alzheimer's disease, and retinitis pigmentosa.

BRIEF DESCRIPTION OF THE DRAWINGS

For the purpose of illustrating the invention, there are depicted in drawings certain embodiments of the invention. However, the invention is not limited to the precise arrangements and instrumentalities of the embodiments depicted in the drawings.

FIG. 1 are graphs and images showing Glut1 repletion averts Glut1 DS in model mice.

FIG. 2 are schematics, graphs and blots showing the novel natural antisense transcript regulates Glut1 expression.

FIG. 5 are gels and graphs illustrating SLC2A1 lncRNA expression in human fibroblast cells knocked down by DsiRNA.

FIG. 6 are gels and graphs showing that human Glut1 expression was decreased after SLC2A1 lncRNA was knocked down by DsiRNA. FIG. 6A are representative blots and FIG. 6B is a graph quantifying the human Glut1 expression relative to a housekeeping gene (beta-actin).

FIG. 7 is a schematic and gel of the hGlut1 locus. FIG. 7A shows the genomic structure of the BAC RP11-125O1 depicting the Cla1 fragment harboring hGlut1 and the NAT. FIG. 7B is a gel of restriction digests of the BAC and the isolated ~79 kb Cla1 fragment containing hGlut1 and the NAT.

DETAILED DESCRIPTION OF THE INVENTION

Definitions

Figures 1A, 1B:
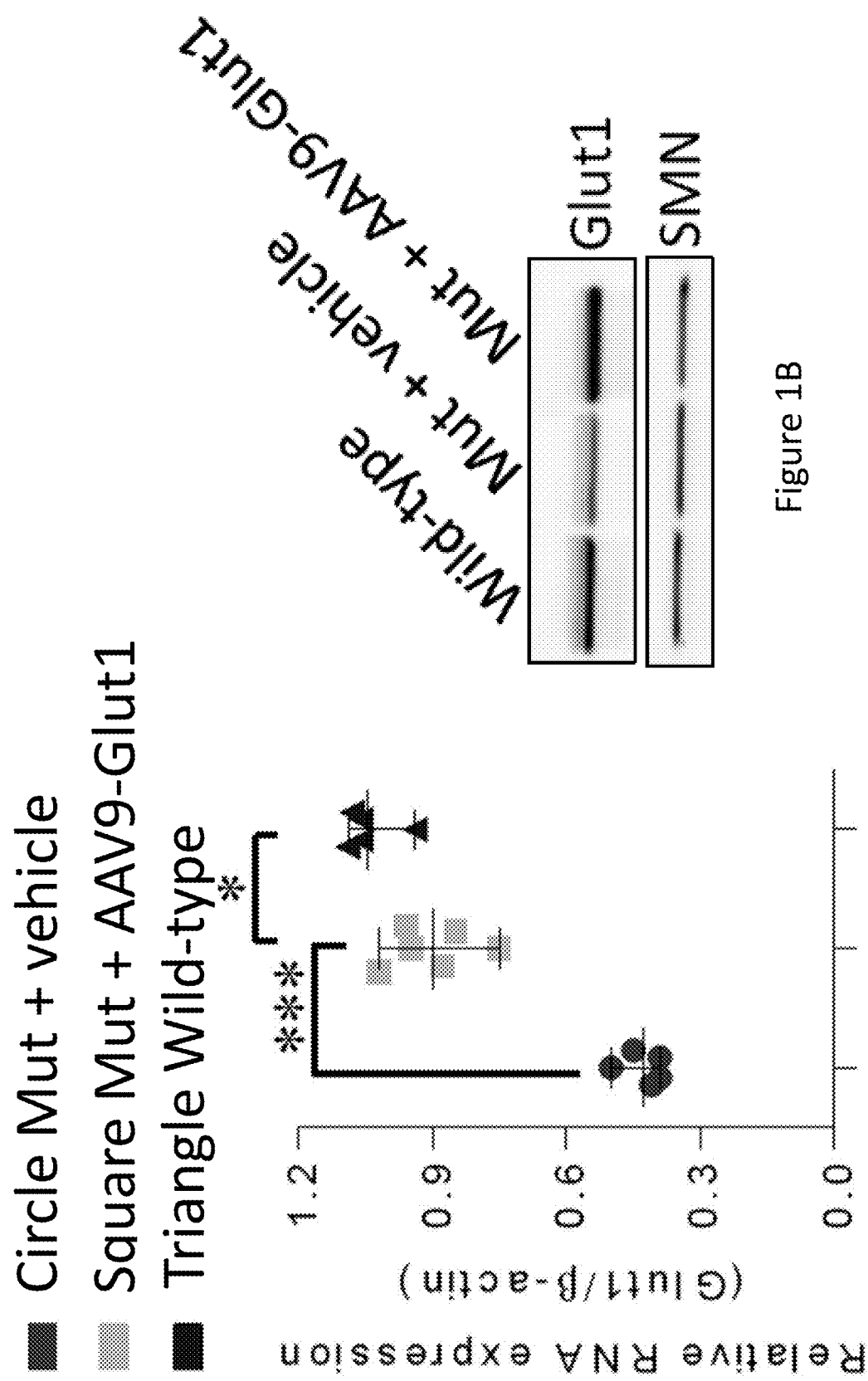
FIG. 1A shows brain Glut1 transcript levels, assessed by Q-PCR, are increased in AAV9-Glut1-treated mice relative to concentrations in vehicle-treated cohorts.
FIG. 1B shows Western blot analysis demonstrating a corresponding increase in Glut1 protein.
Figure 1C:
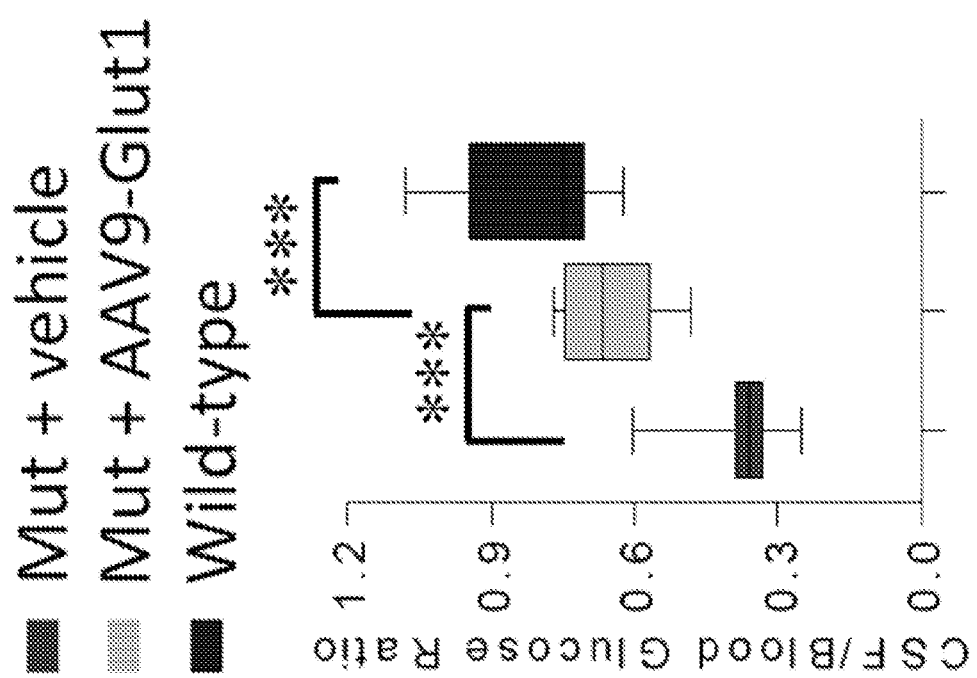
FIG. 1C shows that restoring Glut1 to mutants also mitigates hypoglycorrhachia as determined by a relative increase in CSF/blood glucose levels in mice treated with AAV9-Glut1.
Figure 1D:
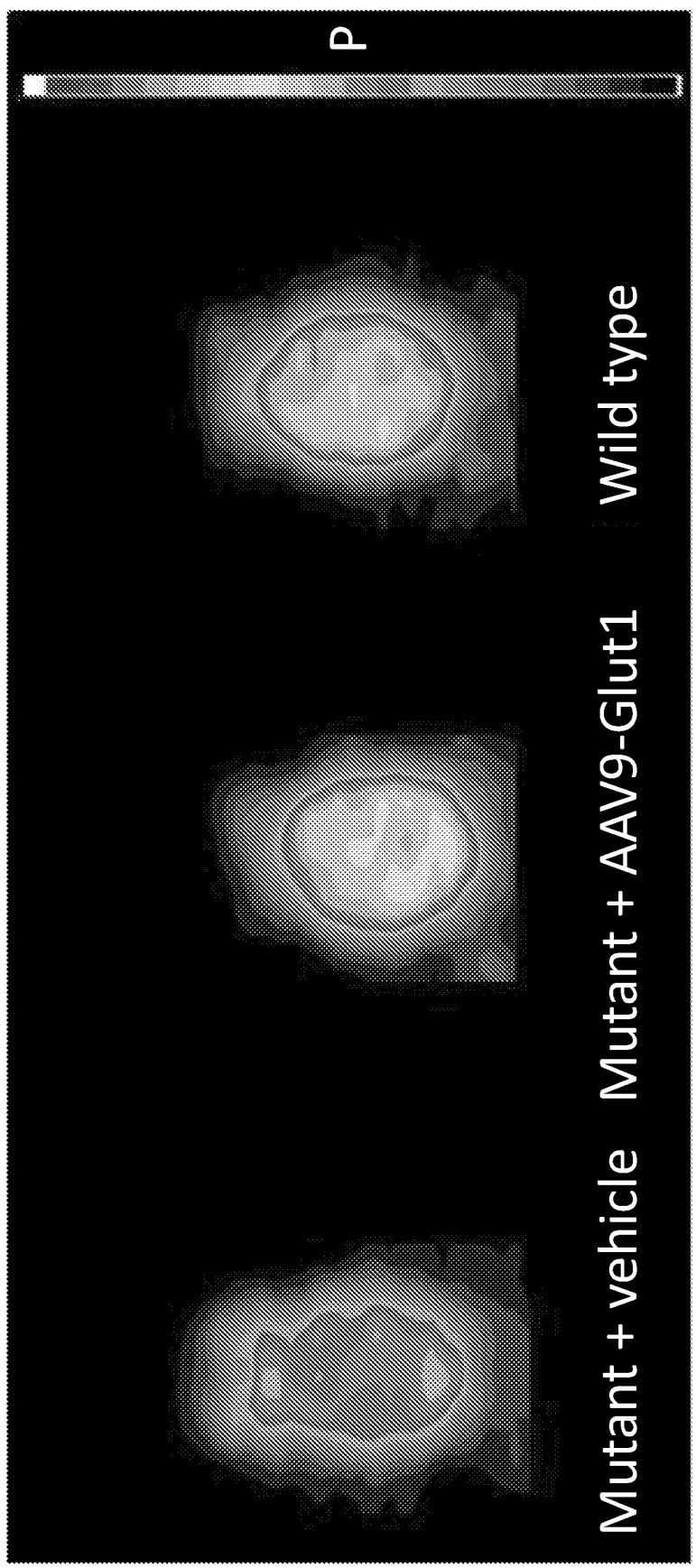
FIG. 1D are results of a PET imaging study depicting a normalization of signal in the brain of a mutant animal restored for the Glut1 protein.
Figure 1E:
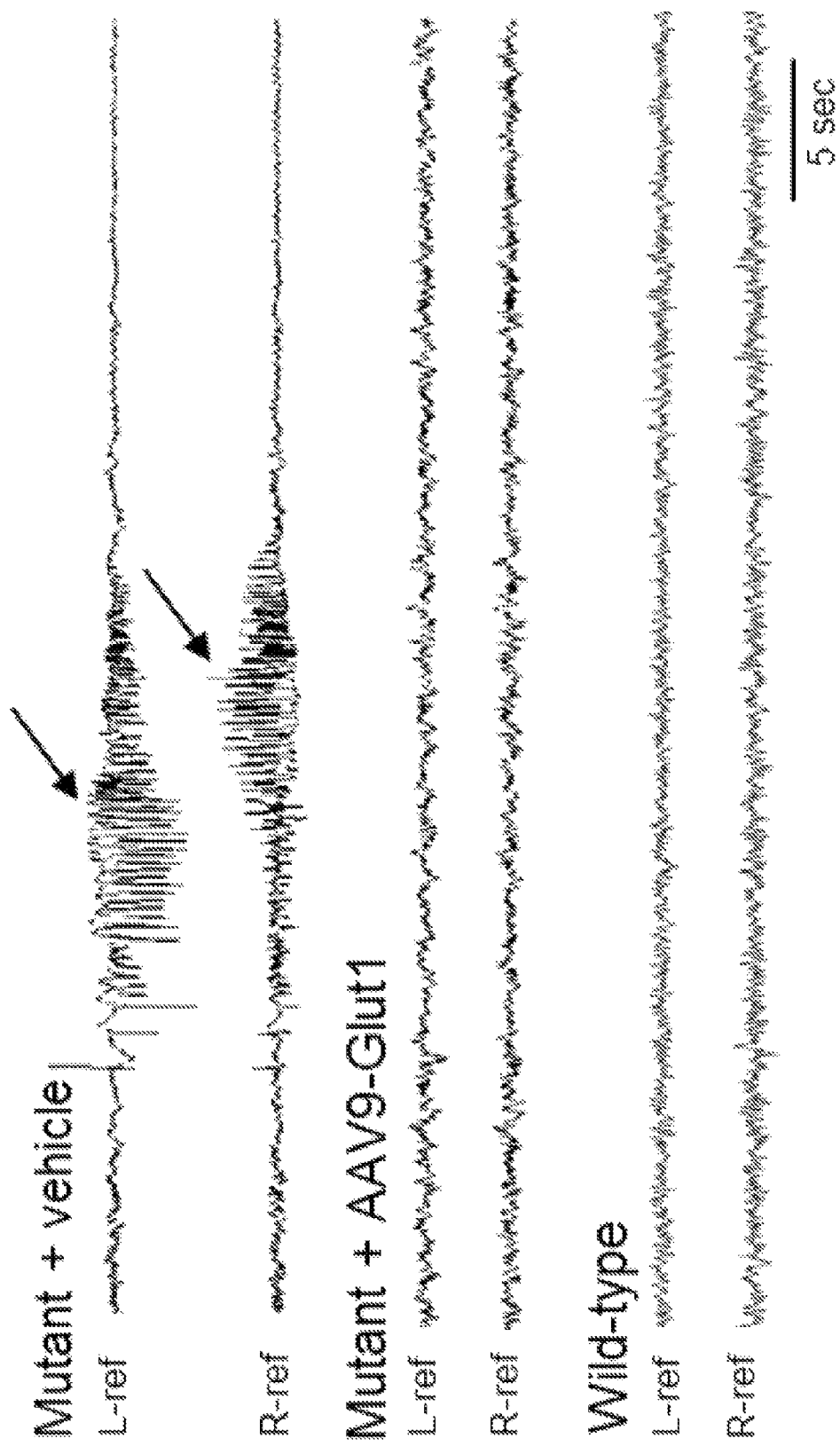
FIG. 1E shows EEG analysis of mutant animals treated with vehicle or AAV9-Glut1 as compared to wild-type mice. This analysis shows Glut1 repletion also results in amelioration of seizure activity (denoted by arrows) in mutant animals. Note: *, *** $P<0.05$, $P<0.001$ respectively, one-way ANOVA, n≥5 of each genotype for results in FIGS. 1A and 1C. Data=Mean SEM.

So that the invention may be more readily understood, certain technical and scientific terms are specifically defined below. Unless specifically defined elsewhere in this document, all other technical and scientific terms used herein have the meaning commonly understood by one of ordinary skill in the art to which this invention belongs.

As used herein, including the appended claims, the singular forms of words such as "a," "an," and "the," include their corresponding plural references unless the context clearly dictates otherwise.

The term "about" is used herein to mean approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 20%.

"Activation," "stimulation," and "treatment," as it applies to cells or to receptors, may have the same meaning, e.g., activation, stimulation, or treatment of a cell or receptor with a ligand, unless indicated otherwise by the context or explicitly. "Ligand" encompasses natural and synthetic ligands, e.g., cytokines, cytokine variants, analogues, muteins, and binding compounds derived from antibodies. "Ligand" also encompasses small molecules, e.g., peptide mimetics of cytokines and peptide mimetics of antibodies. "Activation" can refer to cell activation as regulated by internal mechanisms as well as by external or environmental factors. "Response," e.g., of a cell, tissue, organ, or organism, encompasses a change in biochemical or physiological behavior, e.g., concentration, density, adhesion, or migration within a biological compartment, rate of gene expression, or state of differentiation, where the change is correlated with activation, stimulation, or treatment, or with internal mechanisms such as genetic programming.

"Activity" of a molecule may describe or refer to the binding of the molecule to a ligand or to a receptor, to catalytic activity; to the ability to stimulate gene expression or cell signaling, differentiation, or maturation; to antigenic activity, to the modulation of activities of other molecules, and the like. "Activity" of a molecule may also refer to activity in modulating or maintaining cell-to-cell interactions, e.g., adhesion, or activity in maintaining a structure of a cell, e.g., cell membranes or cytoskeleton. "Activity" can also mean specific activity, e.g., [catalytic activity]/[mg protein], or [immunological activity]/[mg protein], concentration in a biological compartment, or the like. "Activity" may refer to modulation of components of the innate or the adaptive immune systems.

"Administration" and "treatment," as it applies to an animal, human, experimental subject, cell, tissue, organ, or biological fluid, refers to contact of an exogenous pharmaceutical, therapeutic, diagnostic agent, or composition to the animal, human, subject, cell, tissue, organ, or biological fluid. "Administration" and "treatment" can refer, e.g., to therapeutic, pharmacokinetic, diagnostic, research, and experimental methods. Treatment of a cell encompasses contact of a reagent to the cell, as well as contact of a reagent to a fluid, where the fluid is in contact with the cell. "Administration" and "treatment" also means in vitro and ex vivo treatments, e.g., of a cell, by a reagent, diagnostic, binding compound, or by another cell. The term "subject" includes any organism, preferably an animal, more preferably a mammal (e.g., rat, mouse, dog, cat, rabbit) and most preferably a human, including a human patient.

"Treat" or "treating" means to administer a therapeutic agent, such as a composition containing any of the nucleic acid or rAAV constructs or compositions of the present invention, internally or externally to a subject or patient having one or more disease symptoms, or being suspected of having a disease or being at elevated at risk of acquiring a disease, for which the agent has therapeutic activity. Typically, the agent is administered in an amount effective to alleviate one or more disease symptoms in the treated subject or population, whether by inducing the regression of or inhibiting the progression of such symptom(s) by any clinically measurable degree. The amount of a therapeutic agent that is effective to alleviate any particular disease symptom (also referred to as the "therapeutically effective amount") may vary according to factors such as the disease state, age, and weight of the patient, and the ability of the drug to elicit a desired response in the subject Whether a disease symptom has been alleviated can be assessed by any clinical measurement typically used by physicians or other skilled healthcare providers to assess the severity or progression status of that symptom.

The phrase "therapeutically effective amount" is used herein to mean an amount sufficient to cause an improvement in a clinically significant condition in the subject, or delays or minimizes or mitigates one or more symptoms associated with the disease, or results in a desired beneficial change of physiology in the subject.

The term "in need thereof" would be a subject known or suspected of having or being at risk of a disease or disorder characterized by a Glut1 deficiency.

"Isolated nucleic acid molecule" means a DNA or RNA of genomic, mRNA, cDNA, or synthetic origin or some combination thereof which is not associated with all or a portion of a polynucleotide in which the isolated polynucleotide is found in nature or is linked to a polynucleotide to which it is not linked in nature. For purposes of this disclosure, it should be understood that "a nucleic acid molecule comprising" a particular nucleotide sequence does not encompass intact chromosomes. Isolated nucleic acid molecules "comprising" specified nucleic acid sequences may include, in addition to the specified sequences, coding sequences for up to ten or even up to twenty or more other proteins or portions or fragments thereof or may include operably linked regulatory sequences that control expression of the coding region of the recited nucleic acid sequences, and/or may include vector sequences.

The term "vector" includes any genetic element, such as a plasmid, phage, transposon, cosmid, chromosome, artificial chromosome, virus, or virion, which is capable of replication when associated with the proper control elements and which can transfer gene sequences between cells. Thus, the term includes cloning and expression vehicles, as well as viral vectors. In some embodiments, useful vectors are contemplated to be those vectors in which the nucleic acid segment to be transcribed is positioned under the transcriptional control of a promoter.

The phrase "control sequences" refers to DNA sequences necessary for the expression of an operably linked coding sequence in a particular host organism. The control sequences that are suitable for prokaryotes, for example, include a promoter, optionally an operator sequence, and a ribosome binding site. Eukaryotic cells are known to use promoters, polyadenylation signals, and enhancers.

A "promoter" refers to a DNA sequence recognized by the synthetic machinery of the cell, or introduced synthetic machinery, required to initiate the specific transcription of a gene.

The phrases "operatively positioned," "operatively linked," "under control," or "under transcriptional control" means that the promoter is in the correct location and orientation in relation to the nucleic acid to control RNA polymerase initiation and expression of the gene.

The term "expression vector or construct" means any type of genetic construct containing a nucleic acid in which part or all of the nucleic acid encoding sequence is capable of being transcribed. In some embodiments, expression includes transcription of the nucleic acid, for example, to generate a biologically-active polypeptide product or inhibitory RNA (e.g., shRNA, miRNA) from a transcribed gene.

A "host cell" refers to any cell that harbors, or is capable of harboring, a substance of interest. Often a host cell is a mammalian cell. A host cell may be used as a recipient of an AAV helper construct, an AAV minigene plasmid, an accessory function vector, or other transfer DNA associated with the production of recombinant AAVs or other expression vectors. The term includes the progeny of the original cell which has been transfected. Thus, a "host cell" as used herein may refer to a cell which has been transfected with an exogenous DNA sequence. It is understood that the progeny of a single parental cell may not necessarily be completely identical in morphology or in genomic or total DNA complement as the original parent, due to natural, accidental, or deliberate mutation.

As used herein, the expressions "cell," "cell line," and "cell culture" are used interchangeably and all such designations include progeny. Thus, the words "transformants" and "transformed cells" include the primary subject cell and cultures derived therefrom without regard for the number of transfers. It is also understood that not all progeny will have precisely identical DNA content, due to deliberate or inadvertent mutations. Mutant progeny that have the same function or biological activity as screened for in the originally transformed cell are included. Where distinct designations are intended, it will be clear from the context.

With respect to transfected host cells, the term "transfection" is used to refer to the uptake of foreign DNA by a cell, and a cell has been "transfected" when exogenous DNA has been introduced inside the cell membrane. A number of transfection techniques are generally known in the art.

With respect to cells, the term "isolated" refers to a cell that has been isolated from its natural environment (e.g., from a tissue or subject). The term "cell line" refers to a population of cells capable of continuous or prolonged growth and division in vitro. Often, cell lines are clonal populations derived from a single progenitor cell. It is further known in the art that spontaneous or induced changes can occur in karyotype during storage or transfer of such clonal populations. Therefore, cells derived from the cell line referred to may not be precisely identical to the ancestral cells or cultures, and the cell line referred to includes such variants. As used herein, the terms "recombinant cell" refers to a cell into which an exogenous DNA segment, such as DNA segment that leads to the transcription of a biologically-active polypeptide or production of a biologically active nucleic acid such as an RNA, has been introduced.

General Methods

Standard methods in molecular biology are described Sambrook, Fritsch and Maniatis (1982 & 1989 $2^{nd}$ Edition, 2001 $3^{rd}$ Edition) *Molecular Cloning, A Laboratory Manual*, Cold Spring Harbor Laboratory Press, Cold Spring Harbor, NY; Sambrook and Russell (2001) *Molecular Cloning*, $3^{rd}$ ed., Cold Spring Harbor Laboratory Press, Cold Spring Harbor, NY; Wu (1993) *Recombinant DNA*, Vol. 217, Academic Press, San Diego, CA). Standard methods also appear in Ausbel, et al. (2001) *Current Protocols in Molecular Biology*, Vols. 1-4, John Wiley and Sons, Inc. New York, NY, which describes cloning in bacterial cells and DNA mutagenesis (Vol. 1), cloning in mammalian cells and yeast (Vol. 2), glycoconjugates and protein expression (Vol. 3), and bioinformatics (Vol. 4).

Abbreviations
- lncRNA: Long non-coding RNA
- NAT: natural antisense transcript
- SLC2A1-NAT, Glut-NAT, SLC2A-lncRNA: long-non-coding RNA or natural antisense transcript that regulates the expression of SLC2A1 or Glut1 gene. These terms are used interchangeable throughout the application to denote this novel nucleic acid (SEQ ID NO: 1) of the present invention.
- Glut1: Glucose transporter 1, also known as solute carrier family 2, facilitated glucose transporter member 1 (SLC2A1), is a uniporter protein that in humans is encoded by the SLC2A1 gene. Glut1 facilitates the transport of glucose across the plasma membranes of mammalian cells. Glut1 was the first glucose transporter to be characterized. Glut1 1 is highly conserved with the human Glut1 protein (hGlut1) (Accession No: NP_006507.2) and mouse Glut1 protein (mGlut1) (Accession No: NP_035530.2) sharing 98% homology. Glut1 exhibits 40% homology with other Gluts.
- SLC2A1: Gene encoding the human glucose transporter 1 (hGlut1). Human SLC2A1 (Accession No: NG_008232.1; gene ID—6513).
- Slc2a1: Gene encoding mouse Glut1 (mGlut1) (Accession No: Genomic #: NC_000070.6; gene ID—20525).
- GLUT1 DS: Glut1 deficiency syndrome
- AAV: adeno-associated virus
- rAAV recombinant adeno-associated virus or viral vector
- BBB: blood brain barrier The Natural Antisense Transcript (NAT) to the Human SLC2A1 (Glut1) Gene Regulates Expression of the Gene Mutations in the SLC2A1 (also referred to as Glut1) gene result in Glut1 deficiency syndrome (Glut1 DS), a rare but devastating neurodevelopmental disorder (DeVivo et al. 1991). The wild-type Glut1 protein is widely expressed. However, its predominant cellular site of action appears to be the endothelial cells of the brain micro-vessels where it functions in the facilitated transport of glucose across the blood-brain barrier. Reduced levels or loss of the protein results in a complex phenotype whose signature features include hypoglycorrhachia, developmental delay and acquired microcephaly. Patients also exhibit a motor phenotype that is both ataxic as well as dystonic. Mice haplo-insufficient for the slc2a1 gene exhibit many of the features of the human disease. A homozygous knockout of the murine slc2a1 gene is embryonic lethal. Haplo-insufficient animal models exhibit many aspects of the human disease.

Considering the rather poor therapeutic outcome associated with the ketogenic diet, novel treatment options for the disease have been investigated. The inventors have previously demonstrated that augmenting Glut1 levels using an AAV9-Glut1 construct is remarkably effective in averting disease onset in Glut1 DS model mice (Tang et al. 2017). See also Example 1, FIG. 1. Restoring Glut1 in a timely fashion therefore appears to constitute a safe, effective and reliable therapy for Glut1 DS. Such repletion can be conveniently effected using viral vectors. Equally feasible is to enhance expression from the functional allele in diseases of haploinsufficiency such as Glut1 DS. This latter approach has traditionally involved the use of small molecules that relieve transcriptional or translational repression. However, strategies employing small molecules often suffer the prospect of unwanted off-target effects. A more targeted approach involves non-coding RNAs, particularly lncRNAs (long non-coding RNAs), which have recently emerged as important regulators of gene activity (Marques and Ponting 2009).

The present invention is based at least in part on the discovery of a natural antisense transcript (NAT) to the human SLC2A1 (Glut1) gene. Unlike the ketogenic diet, the invention is based on specifically targeting the Glut1 gene and therefore relies on specifically altering Glut1 levels. The NAT is a potent regulator of Glut1; inhibiting NAT expression results in a fall in Glut1 levels, while increasing NAT levels raises Glut1 levels. This suggests that levels of the transcript can be modulated as a means of controlling Glut1 concentrations.

Figure 2A:
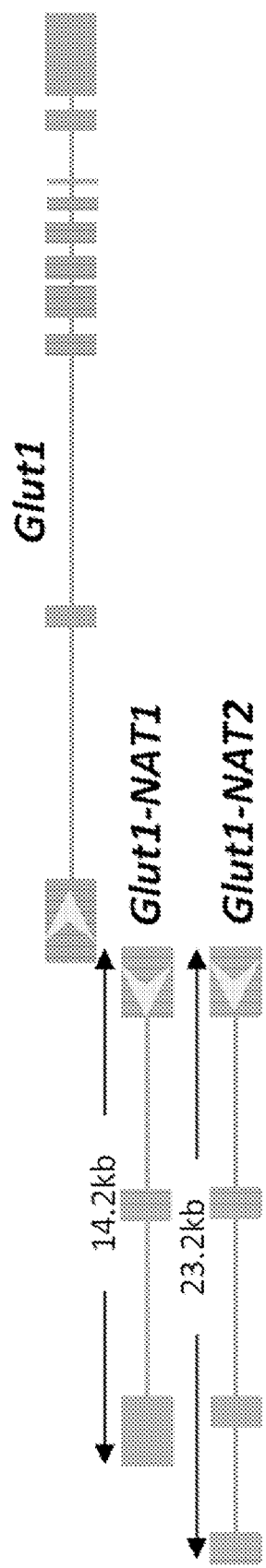
FIG. 2A shows the genomic organization of chromosome 1 locus harboring the Glut1 gene and the lncRNA. Depicted are the two lncRNA alternatively spliced isoforms (Glut1-NAT1 and Glut1-NAT2).

In the process of investigating the Glut1 promoter region, a novel lncRNA associated with the gene was found. 3' RACE analysis demonstrated that it is alternatively spliced, the two resulting transcripts differing from one another in the number of exons each harbors. The transcripts each overlap part of exon 1 of the Glut1 (SLC2A1) gene but are expressed antisense to the protein coding gene. Accordingly, these were termed the lncRNA, SLC2A1-NAT (Natural Antisense Transcript) and its two isoforms SLC2A1-NAT1 and SLC2A1-NAT2 (FIG. 2A). SLC2A1-NAT1 (NAT1) and SLC2A1-NAT2 (NAT2) share exons 1 and 2, but whereas exon 3 in NAT1 is large (approximately 2.5 kb), its counterpart in NAT2 is much smaller (215 bp) and followed by a fourth exon of similar size. Thus, the cDNAs of the two transcripts are approximately 3.1 kb (NAT1) and approximately 1.1 kb (NAT2), and the corresponding genomic regions approximately 14 kb and 23 kb respectively. Importantly, bioinformatics analysis indicated that neither NAT has any protein coding potential. This, combined with established criteria pertaining to ncRNA length best defines them as bona fide lncRNAs (ncRNAs>200 bp in size).

Additional data pertinent to the lncRNA is as follows (see Example 2). First, bioinformatics analysis indicated that the NATs identified are restricted to primates and absent in rodents. This is consistent with the notion that lncRNAs are less evolutionarily conserved than are their protein coding mRNA counterparts (Bélanger et al. 2011). Second, each NAT is widely expressed in humans. However, brain tissue and, particularly, cerebral cortex, expressed especially high levels (greater than 25 times that detected in fibroblasts) of the two (FIGS. 2B and C). Finally, relative to Glut1 levels, the lncRNA as assessed by NAT1, is more modestly expressed (FIG. 2D). This data conformed to investigations of other lncRNAs and their expression relative to those of mRNAs (DeGiorgis and Veggiotti 2013)

Natural antisense transcripts have emerged as important regulators of their overlapping cognate protein coding genes (Brockmann 2009; Arsoy et al. 2012; Klepper and Leiendecker 2013). Accordingly, the effects of modulating the expression of SLC2A1-NAT on Glut1 levels was examined. First siRNAs to suppress the two NATs in fibroblasts were used and it was found that Glut1 transcripts as well as protein fell correspondingly (FIGS. 2E and 2F). This was confirmed using three different siRNAs in multiple fibroblast lines as well as in primary brain endothelial cells.

Next, SLC2A1-NAT2 was over-expressed in fibroblasts. In this instance, it was found that Glut1 transcripts and protein were increased in a significant manner (FIGS. 2G and 2H). Finally, it was inquired if specific domains (exons) of NAT2 are responsible for mediating the increase in Glut1 expression. It was found that exons 1-3 are as efficient as the full-length (exons 1-4) lncRNA in driving Glut1 expression, whereas exon 1 or exons 1-2 fail to have any appreciable effect on Glut1 levels (FIG. 2I). One interpretation of this finding is that the combination of exons 2 and 3 is critical in regulating/increasing Glut1 expression.

Figure 3:
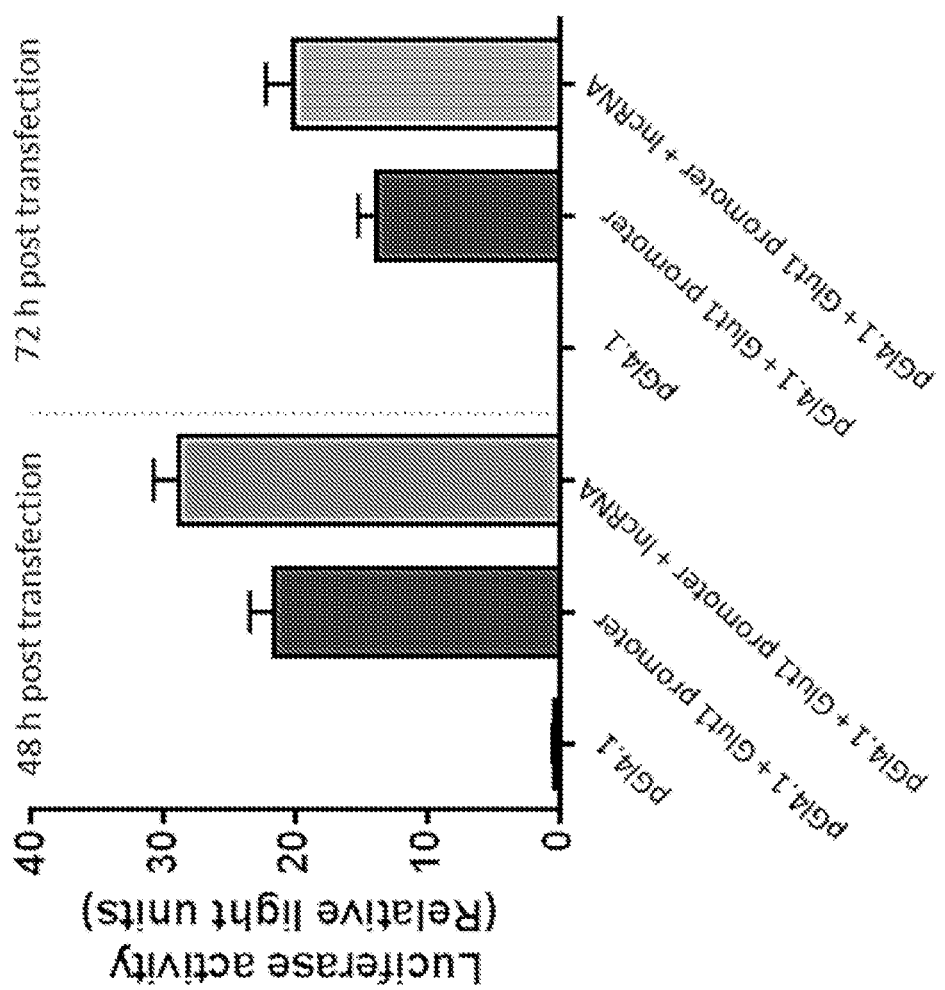
FIG. 3 is a graph showing the results of luciferase activity in HEK293 cells transfected with the indicated constructs, pGL4.1 promoter alone, pGL4.1 promoter+Glut1 promoter, and pGL4.1 promoter+Glut1 promoter+lncRNA.

Further evidence is shown herein that the natural antisense transcript regulates Glut1 expression. The antisense transcript can enhance Glut1 expression (Example 3; FIG. 3). Accordingly, the knockdown of the antisense transcript decreased Glut1 expression (Example 4; FIG. 6).

SLC2A1-NAT Nucleic Acids

These results illustrated that a novel long non-coding RNA (lncRNA) or natural antisense transcript (NAT) plays an important role in regulating the expression of the SLC2A1 or Glut1 gene and its associated pathways.

Thus, the present invention provides for this natural antisense transcript denoted SLC2A1-NAT nucleic acid. In some embodiments, the nucleic acid is RNA. In some embodiments, the nucleic acid is DNA. In some embodiments, the nucleic acid is cDNA.

In some embodiments, the SLC2A1-NAT is SLC2A1-NAT2.

SLC2A1-NAT comprises the nucleotide sequence SEQ ID NO: 1.

The present invention also provides for a nucleic acid comprising exons 1-3 of SLC2A1-NAT comprising the sequence SEQ ID NO: 2. In some embodiments, the nucleic acid is RNA. In some embodiments, the nucleic acid is DNA. In some embodiments, the nucleic acid is cDNA. As shown herein, the exons 1-3 are sufficient to regulate expression of the SLC2A1 gene.

For reference, exon 1 comprises nucleotides 1-529 of SEQ ID NOs: 1 and 2; exon 2 comprises nucleotides 530-675 of SEQ ID NOs: 1 and 2; and exon 3 comprises nucleotides 676-890 of SEQ ID NOs: 1 and 2.

The present invention also includes variants and fragments of the SLC2A1-NAT nucleic acids, including variants of SEQ ID NOs: 1 and 2, having at least 50%, at least 60%, at least 70%, at least 75%, at least 80%, at least 85%, at least 90%, at least 95%, and at least 99% identity to any of SEQ ID NOs: 1 and 2.

The present invention also provides for recombinant constructs comprising the SLC2A1-NAT RNA or the DNA encoding the SLC2A1-NAT, and a vector that can be expressed in a transformed host cell. The present invention also includes the host cells transformed with the recombinant construct comprising the SLC2A1-NAT RNA or the DNA encoding the SLC2A1-NAT RNA, and a vector.

Expression vectors may be useful, comprising various nucleic acids, wherein the nucleic acid is operably linked to control sequences that are recognized by a host cell when the host cell is transfected with the vector.

Also provided are the virions comprising recombinant AAV and SLC2A1-NAT nucleic acid described herein, which serve to increase expression of Glut-1, and which may, in certain embodiments be under the direction of chicken-β-actin promoter and a CMV enhancer. These sequences may be packaged with the AAV9 capsid to form the virions that are therapeutic to Glut-1 deficiency in the present invention.

As shown in Example 1, rAAV-Glut1 constructs were delivered to the appropriate tissue in mutant mice and restored Glut1 expression and function. Thus it is expected that such constructs of rAAV and the SLC2A1-NAT nucleic acid described herein would be delivered to the appropriate tissue and restore Glut 1 expression and function.

Use of Glut-NAT as a Treatment for Glut1 Deficiency Syndrome

As shown herein, SLC2A1-NAT increases the expression of Glut1. Thus the invention also provides for treating Glut1 deficiency syndrome in a subject in need thereof, by administering a SLC2A1-NAT nucleic acid as described herein.

The invention also provides for treating Glut1 deficiency syndrome in a subject in need thereof, by administering a therapeutically effective amount of a pharmaceutical composition comprising a SLC2A1-NAT nucleic acid as described herein.

The present invention also provides for a method of alleviating in a subject, at least one of the symptoms associated with Glut1 deficiency syndrome selected from the group consisting of hypoglycorrhachia, acquired microcephaly, ataxic and dystonic motor dysfunction, by administering a SLC2A1-NAT nucleic acid described herein.

The present invention also provides for a method of alleviating in a subject, at least one of the symptoms associated with Glut1 deficiency syndrome selected from the group consisting of hypoglycorrhachia, acquired microcephaly, ataxic and dystonic motor dysfunction, by administering a therapeutically effective amount of a pharmaceutical composition comprising a SLC2A1-NAT nucleic acid described herein.

The present invention further provides for a method of restoring Glut1 transport in the blood brain barrier (BBB) of a subject, by administering SLC2A1-NAT nucleic acid as described herein.

The present invention also provides for a method of restoring Glut1 transport in the blood brain barrier (BBB) of a subject, comprising administering a therapeutically effective amount of a pharmaceutical composition comprising a SLC2A1-NAT nucleic acid described herein.

The SLC2A1-NAT nucleic acids for use in the methods of the invention include those comprising the sequences SEQ ID NOs: 1 and 2 and variants and fragments thereof. The nucleic acids can be RNA or DNA. The DNA can be cDNA.

The pharmaceutical compositions for use in the methods of the invention can further comprise one or more pharmaceutically acceptable excipient, ligand, a conjugate, a vector, a lipid, a nanoparticle, a liposome, a carrier, an adjuvant or a diluent.

In yet additional embodiments, the nucleic acid is provided in a recombinant adeno-associated vector (rAAV). In additional embodiments, the rAAV vector further comprises a chicken Beta-actin promoter and wherein the rAAV is capable of crossing the blood-brain barrier (BBB). In yet additional embodiments, the AAV is AAV8 or AAV9.

Recombinant AAV Vectors

"Recombinant AAV (rAAV) vectors" described herein may be composed of, at a minimum, a nucleic acid comprising SLC2A1-NAT (SEQ ID NO: 1), variants and fragments thereof, and optionally useful regulatory sequences, and 5' and 3' AAV inverted terminal repeats (ITRs).

Alternatively, the rAAV vectors described herein may be composed of, at a minimum, a nucleic acid comprising exons 1-3 of SLC2A1-NAT (SEQ ID NO: 2), variants and fragments thereof, and optionally useful regulatory sequences, and 5' and 3' AAV inverted terminal repeats (ITRs).

In certain embodiments, this recombinant AAV vector is packaged into a capsid protein and delivered to a selected target cell, and the nucleic acid comprising SLC2A1-NAT, and variants and fragments thereof, serves to increase expression of Glut1 and provide therapeutic benefits to a Glut1 deficient patient.

The AAV sequences of the vector may comprise the cis-acting 5' and 3' inverted terminal repeat sequences (See, e.g., B. J. Carter, in "Handbook of Parvoviruses", ed., P. Tijsser, CRC Press, pp. 155 168 (1990)). The ITR sequences are typically about 145 bp in length. Preferably, substantially the entire sequences encoding the ITRs are used in the molecule, although some degree of minor modification of these sequences is permissible. (See, e.g., texts such as Sambrook et al, "Molecular Cloning. A Laboratory Manual", 2d ed., Cold Spring harbor Laboratory, New York (1989); and K. Fisher et al., J. Virol., 70:520 532 (1996)). An example of such a molecule is a "cis-acting" plasmid containing the transgene, in which the selected transgene sequence and associated regulatory elements are flanked by the 5' and 3' AAV ITR sequences. The AAV ITR sequences may be obtained from any known AAV, including presently identified mammalian AAV types.

In addition to the elements identified above for recombinant AAV vectors, the vector may also include conventional control elements which are operably linked to the transgene in a manner which permits its transcription, translation and/or expression in a cell transfected with the plasmid vector or infected with the virus produced by the invention. As used herein, "operably linked" sequences include both expression control sequences that are contiguous with the gene of interest and expression control sequences that act in trans or at a distance to control the gene of interest. Expression control sequences include appropriate transcription initiation, termination, promoter and enhancer sequences; efficient RNA processing signals such as splicing and polyadenylation (polyA) signals; sequences that stabilize cytoplasmic mRNA; sequences that enhance translation efficiency (i.e., Kozak consensus sequence); sequences that enhance protein stability; and when desired, sequences that enhance secretion of the encoded product. A great number of expression control sequences, including promoters which are native, constitutive, inducible and/or tissue-specific, are known in the art and may be utilized.

As used herein, a nucleic acid sequence and regulatory sequences are said to be operably linked when they are covalently linked in such a way as to place the expression or transcription of the nucleic acid sequence under the influence or control of the regulatory sequences. If it is desired that the nucleic acid sequences be translated into a functional protein, two DNA sequences are said to be operably linked if induction of a promoter in the 5' regulatory sequences results in the transcription of the coding sequence and if the nature of the linkage between the two DNA sequences does not (1) result in the introduction of a frame-shift mutation, (2) interfere with the ability of the promoter region to direct the transcription of the coding sequences, or (3) interfere with the ability of the corresponding RNA transcript to be translated into a protein. Thus, a promoter region would be operably linked to a nucleic acid sequence if the promoter region were capable of effecting transcription of that DNA sequence such that the resulting transcript might be translated into the desired protein or polypeptide. Similarly two or more coding regions are operably linked when they are linked in such a way that their transcription from a common promoter results in the expression of two or more proteins having been translated in frame. In some embodiments, operably linked coding sequences yield a fusion protein. In some embodiments, operably linked coding sequences yield a functional RNA (e.g., shRNA, miRNA).

For nucleic acids encoding proteins, a polyadenylation sequence generally is inserted following the transgene sequences and before the 3' AAV ITR sequence. An rAAV construct useful in the present invention may also contain an intron, desirably located between the promoter/enhancer sequence and the transgene. One possible intron sequence is derived from SV-40, and is referred to as the SV-40 T intron sequence. Another vector element that may be used is an internal ribosome entry site (IRES). An IRES sequence is used to produce more than one polypeptide from a single gene transcript. An IRES sequence would be used to produce a protein that contain more than one polypeptide chains. Selection of these and other common vector elements are conventional and many such sequences are available (see, e.g., Sambrook et al, and references cited therein at, for example, pages 3.18 3.26 and 16.17 16.27 and Ausubel et al., Current Protocols in Molecular Biology, John Wiley & Sons, New York, 1989). In some circumstances, a Foot and Mouth Disease Virus 2A sequence may be included in a polyprotein; this is a small peptide (approximately 18 amino acids in length) that has been shown to mediate the cleavage of polyproteins. The cleavage activity of the 2A sequence has previously been demonstrated in artificial systems including plasmids and gene therapy vectors (AAV and retroviruses) (Ryan et al., EMBO, 1994; 4:928-933; Mattion et al., J Virology, November 1996; p. 8124-8127; Furler et al., Gene Therapy, 2001; 8:864-873; and Halpin et al., The Plant Journal, 1999; 4:453-459; de Felipe et al., Gene Therapy, 1999; 6:198-208; de Felipe et al., Human Gene Therapy, 2000; 11:1921-1931; and Klump et al., Gene Therapy, 2001; 8:811-817).

The precise nature of the regulatory sequences needed for gene expression in host cells may vary between species, tissues or cell types, but shall in general include, as necessary, 5' non-transcribed and 5' non-translated sequences involved with the initiation of transcription and translation respectively, such as a TATA box, capping sequence, CAAT sequence, enhancer elements, and the like. Especially, such 5' non-transcribed regulatory sequences will include a promoter region that includes a promoter sequence for transcriptional control of the operably joined gene. Regulatory sequences may also include enhancer sequences or upstream activator sequences as desired. The vectors may optionally include 5' leader or signal sequences.

Examples of constitutive promoters include, without limitation, the retroviral Rous sarcoma virus (RSV) LTR promoter (optionally with the RSV enhancer), the cytomegalovirus (CMV) promoter (optionally with the CMV enhancer) (see, e.g., Boshart et al, Cell, 41:521-530 (1985)), the SV40 promoter, the dihydrofolate reductase promoter, the 13-actin promoter, the phosphoglycerol kinase (PGK) promoter, and the EFla promoter [Invitrogen].

Inducible promoters allow regulation of gene expression and can be regulated by exogenously supplied compounds, environmental factors such as temperature, or the presence of a specific physiological state, e.g., acute phase, a particular differentiation state of the cell, or in replicating cells only. Inducible promoters and inducible systems are available from a variety of commercial sources, including, without limitation, Invitrogen, Clontech and Ariad. Examples of inducible promoters regulated by exogenously supplied promoters include the zinc-inducible sheep metallothionine (MT) promoter, the dexamethasone (Dex)-inducible mouse mammary tumor virus (MMTV) promoter, the T7 polymerase promoter system (WO 98/10088); the ecdysone insect promoter (No et al., Proc. Natl. Acad. Sci. USA, 93:3346-3351 (1996)), the tetracycline-repressible system (Gossen et al. (1992) Proc. Natl. Acad. Sci. USA, 89:5547-5551), the tetracycline-inducible system (Gossen et al. (1995) Science, 268:1766-1769, see also Harvey et al. (1998) Curr. Opin. Chem. Biol., 2:512-518), the RU486-inducible system (Wang et al. (1997) Nat. Biotech., 15:239-243 and Wang et al. (1997) Gene Ther., 4:432-441) and the rapamycin-inducible system (Magari et al. (1997) J. Clin. Invest., 100:2865-2872). Still other types of inducible promoters which may be useful in this context are those which are regulated by a specific physiological state, e.g., temperature, acute phase, a particular differentiation state of the cell, or in replicating cells only.

In another embodiment, the native promoter, or fragment thereof, for the transgene will be used. The native promoter may be preferred when it is desired that expression of the transgene should mimic the native expression. The native promoter may be used when expression of the transgene must be regulated temporally or developmentally, or in a tissue-specific manner, or in response to specific transcriptional stimuli. In a further embodiment, other native expression control elements, such as enhancer elements, polyadenylation sites or Kozak consensus sequences may also be used to mimic the native expression.

In some embodiments, the regulatory sequences impart tissue-specific gene expression capabilities. In some cases, the tissue-specific regulatory sequences bind tissue-specific transcription factors that induce transcription in a tissue specific manner. Such tissue-specific regulatory sequences (e.g., promoters, enhancers) are well known in the art. Exemplary tissue-specific regulatory sequences include but are not limited to the following tissue specific promoters: neuronal such as neuron-specific enolase (NSE) promoter (Andersen et al. (1993) Cell. Mol. Neurobiol., 13:503-15), neurofilament light-chain gene promoter (Piccioli et al. (1991) Proc. Natl. Acad. Sci. USA, 88:5611-5), and the neuron-specific vgf gene promoter (Piccioli et al. (1995) Neuron, 15:373-84). In some embodiments, the tissue-specific promoter is a promoter of a gene selected from: neuronal nuclei (NeuN), glial fibrillary acidic protein (GFAP), adenomatous polyposis coli (APC), and ionized calcium-binding adapter molecule 1 (Iba-1). In some embodiments, the promoter is a chicken Beta-actin promoter.

Methods for obtaining recombinant AAVs having a desired capsid protein have been described (See, for example, US 2003/0138772, the contents of which are incorporated herein by reference in their entirety). A number of different AAV capsid proteins have been described, for example, those disclosed in Gao et al. (2004) J. Virol, 78 (12): 6381-6388; Gao et al. (2004) Proc Natl Acad Sci USA, 100 (10): 6081-6086. For the desired packaging of the presently described constructs and methods, the AAV9 vector and capsid is preferred. However, it is noted that other suitable AAVs such as rAAVrh.8 and rAAVrh.10, or other similar vectors may be adapted for use in the present invention. Typically the methods involve culturing a host cell which contains a nucleic acid sequence encoding an AAV capsid protein or fragment thereof; a functional rep gene; a recombinant AAV vector composed of AAV inverted terminal repeats (ITRs) and a transgene; and sufficient helper functions to permit packaging of the recombinant AAV vector into the AAV capsid proteins.

The components to be cultured in the host cell to package a rAAV vector in an AAV capsid may be provided to the host cell in trans. Alternatively, any one or more of the required components (e.g., recombinant AAV vector, rep sequences, cap sequences, and/or helper functions) may be provided by a stable host cell which has been engineered to contain one or more of the required components using methods known to those of skill in the art. Most suitably, such a stable host cell will contain the required component(s) under the control of an inducible promoter. However, the required component(s) may be under the control of a constitutive promoter. In still another alternative, a selected stable host cell may contain selected component(s) under the control of a constitutive promoter and other selected component(s) under the control of one or more inducible promoters. For example, a stable host cell may be generated which is derived from 293 cells (which contain E1 helper functions under the control of a constitutive promoter), but which contain the rep and/or cap proteins under the control of inducible promoters.

The recombinant AAV vector, rep sequences, cap sequences, and helper functions for producing the rAAV may be delivered to the packaging host cell using any appropriate genetic element (vector). The selected genetic element may be delivered by any suitable method, including those described herein. See, e.g., Fisher et al. (1993) J. Virol., 70:520-532 and U.S. Pat. No. 5,478,745.

In some embodiments, recombinant AAVs may be produced using the triple transfection method (e.g., as described in detail in U.S. Pat. No. 6,001,650). Typically, the recombinant AAVs are produced by transfecting a host cell with a recombinant AAV vector (comprising a transgene) to be packaged into AAV particles, an AAV helper function vector, and an accessory function vector. An AAV helper function vector encodes the "AAV helper function" sequences (i.e., rep and cap), which function in trans for productive AAV replication and encapsidation. Preferably, the AAV helper function vector supports efficient AAV vector production without generating any detectable wild-type AAV virions (i.e., AAV virions containing functional rep and cap genes). Non-limiting examples of vectors suitable for use with the present invention include pHLP19, described in U.S. Pat. No. 6,001,650 and pRep6cap6 vector, described in U.S. Pat. No. 6,156,303. The accessory function vector encodes nucleotide sequences for non-AAV derived viral and/or cellular functions upon which AAV is dependent for replication (i.e., "accessory functions"). The accessory functions include those functions required for AAV replication, including, without limitation, those moieties involved in activation of AAV gene transcription, stage specific AAV mRNA splicing, AAV DNA replication, synthesis of cap expression products, and AAV capsid assembly. Viral-based accessory functions can be derived from any of the known helper viruses such as adenovirus, herpesvirus (other than herpes simplex virus type-1), and vaccinia virus.

Pharmaceutical Compositions and Administration
Compositions and Methods for Administration of the SLC2A1-NAT Nucleic Acids Delivery vehicles such as liposomes, nanocapsules, microparticles, microspheres, lipid particles, vesicles, and the like can be used to deliver the nucleic acid comprising SLC2A1-NAT nucleic acid described herein.

The formation and use of liposomes is generally known to those of skill in the art. Recently, liposomes were developed with improved serum stability and circulation half-times (U.S. Pat. No. 5,741,516). Further, various methods of liposome and liposome like preparations as potential drug carriers have been described (U.S. Pat. Nos. 5,567,434; 5,552,157; 5,565,213; 5,738,868; and 5,795,587).

Liposomes have been used successfully with a number of cell types that are normally resistant to transfection by other procedures. In addition, liposomes are free of the DNA length constraints that are typical of viral-based delivery systems. Liposomes have been used effectively to introduce genes, drugs, radiotherapeutic agents, viruses, transcription factors and allosteric effectors into a variety of cultured cell lines and animals. In addition, several successful clinical trials examining the effectiveness of liposome-mediated drug delivery have been completed.

Liposomes are formed from phospholipids that are dispersed in an aqueous medium and spontaneously form multilamellar concentric bilayer vesicles (also termed multilamellar vesicles (MLVs). MLVs generally have diameters of from 25 nm to 4 µm. Sonication of MLVs results in the formation of small unilamellar vesicles (SUVs) with diameters in the range of 200 to 500 Å, containing an aqueous solution in the core.

Alternatively, nanocapsule or nanoparticle formulations may be used. Nanocapsules can generally entrap substances in a stable and reproducible way. Nanoparticles can be used to transport drugs through the BBB when administered intravenously as well as the factors that influence its transportation.

NPs are colloidal carriers that can have a natural or synthetic origin and can vary from 1 to 1000 nm in size. Synthetic NPs may be prepared from polymeric materials such as poly(ethylenimine) (PEI), poly(alkylcyanoacrylates), poly(amidoamine) dendrimers (PAMAM), poly(ε-caprolactone) (PCL), poly(lactic-co-glycolic acid) (PLGA), polyesters (poly(lactic acid) (PLA), or from inorganic materials such as gold, silicon dioxide (silica), among others. These carriers can transport drugs by adsorbing, entrapping or bounding covalently to them. Natural NPs are produced from natural polymers, such as polysaccharides (chitosan and alginate), amino acids (poly(lysine), poly(aspartic acid) (PASA)), or proteins (gelatin and albumin). Natural NPs have the advantage of providing biological signals to interact with specific receptors/transporters expressed by endothelial cells.

A number of ligands have been conjugated to NPs to facilitate BBB penetration. Such molecules can be grouped into four different types: (i) ligands that mediate the adsorption of proteins from the bloodstream that interact directly with BBB receptors or transporters; (ii) ligands that have direct interaction per se with BBB receptors or transporters; (iii) ligands that increase charge and hydrophobicity; and (iv) ligands that improve blood circulation time (e.g. PEG).

Other methods for assisting the NPs to cross the blood-brain barrier would include but are not limited to receptor mediated transport, transporter mediated transport, absorptive mediated transport, and cell penetrating transport. See generally Gao 2016.

Mammalian virus vectors that can be used to deliver the RNA include oncoretroviral vectors, adenovirus vectors, Herpes simplex virus vectors, and lentiviruses.

In particular, HSV vectors are tropic for the central nervous system (CNS) and can establish lifelong latent infections in neurons and thus, are a preferred vector for use in this invention.

Recombinant AAV Compositions and Methods of Administration

The rAAVs may be delivered to a subject in compositions according to any appropriate methods known in the art. The rAAV, preferably suspended in a physiologically compatible carrier (e.g., in a composition), may be administered to a subject, e.g., a human, mouse, rat, cat, dog, sheep, rabbit, horse, cow, goat, pig, guinea pig, hamster, chicken, turkey, or a non-human primate. In certain embodiments, compositions may comprise a rAAV alone, or in combination with one or more other viruses (e.g., a second rAAV encoding having one or more different transgenes).

Suitable carriers may be readily selected by one of skill in the art in view of the indication for which the rAAV is directed. For example, one suitable carrier includes saline, which may be formulated with a variety of buffering solutions (e.g., phosphate buffered saline). Other exemplary carriers include sterile saline, lactose, sucrose, calcium phosphate, gelatin, dextran, agar, pectin, peanut oil, sesame oil, and water. The selection of the carrier is not a limitation of the present invention.

Optionally, the compositions of the invention may contain, in addition to the rAAV and carrier(s), other conventional pharmaceutical ingredients, such as preservatives, or chemical stabilizers. Suitable exemplary preservatives include chlorobutanol, potassium sorbate, sorbic acid, sulfur dioxide, propyl gallate, the parabens, ethyl vanillin, glycerin, phenol, and parachlorophenol. Suitable chemical stabilizers include gelatin and albumin.

The dose of rAAV virions required to achieve a desired effect or "therapeutic effect," e.g., the units of dose in vector genomes/per kilogram of body weight (vg/kg), will vary based on several factors including, but not limited to: the route of rAAV administration, the level of gene or RNA expression required to achieve a therapeutic effect, the specific disease or disorder being treated, and the stability of the gene or RNA product. One of skill in the art can readily determine a rAAV virion dose range to treat a subject having a particular disease or disorder based on the aforementioned factors, as well as other factors that are well known in the art. An effective amount of the rAAV is generally in the range of from about 10 µl to about 100 ml of solution containing from about $10^9$ to $10^{16}$ genome copies per subject. Other volumes of solution may be used. The volume used will typically depend, among other things, on the size of the subject, the dose of the rAAV, and the route of administration. For example, for intrathecal or intracerebral administration a volume in range of 1 µl to 10 µl or 10 µl to 100 µl may be used. For intravenous administration a volume in range of 10

μl to 100 μl, 100 μl to 1 ml, 1 ml to 10 ml, or more may be used. In some cases, a dosage between about $10^{10}$ to $10^{12}$ rAAV genome copies per subject is appropriate. In certain embodiments, $10^{12}$ rAAV genome copies per subject is effective to target CNS tissues. In some embodiments the rAAV is administered at a dose of $10^{10}$, $10^{11}$, $10^{12}$, $10^{13}$, $10^{14}$, or $10^{15}$ genome copies per subject. In some embodiments the rAAV is administered at a dose of $10^{10}$, $10^{11}$, $10^{12}$, $10^{13}$, or $10^{14}$ genome copies per kg.

In some embodiments, rAAV compositions are formulated to reduce aggregation of AAV particles in the composition, particularly where high rAAV concentrations are present (e.g., about $10^{13}$ GC/ml or more). Methods for reducing aggregation of rAAVs are well known in the art and, include, for example, addition of surfactants, pH adjustment, salt concentration adjustment, etc. (See, e.g., Wright et al. (2005) *Molecular Therapy* 12:171-178.)

Formulation of pharmaceutically-acceptable excipients and carrier solutions is well-known to those of skill in the art, as is the development of suitable dosing and treatment regimens for using the particular compositions described herein in a variety of treatment regimens. Typically, these formulations may contain at least about 0.1% of the active ingredient or more, although the percentage of the active ingredient(s) may, of course, be varied and may conveniently be between about 1 or 2% and about 70% or 80% or more of the weight or volume of the total formulation. Naturally, the amount of active ingredient in each therapeutically-useful composition may be prepared is such a way that a suitable dosage will be obtained in any given unit dose of the compound. Factors such as solubility, bioavailability, biological half-life, route of administration, product shelf life, as well as other pharmacological considerations will be contemplated by one skilled in the art of preparing such pharmaceutical formulations, and as such, a variety of dosages and treatment regimens may be desirable.

The pharmaceutical forms suitable for injectable use include sterile aqueous solutions or dispersions and sterile powders for the extemporaneous preparation of sterile injectable solutions or dispersions. Dispersions may also be prepared in glycerol, liquid polyethylene glycols, and mixtures thereof and in oils. Under ordinary conditions of storage and use, these preparations contain a preservative to prevent the growth of microorganisms. In many cases the form is sterile and fluid to the extent that easy syringability exists. It must be stable under the conditions of manufacture and storage and must be preserved against the contaminating action of microorganisms, such as bacteria and fungi. The carrier can be a solvent or dispersion medium containing, for example, water, ethanol, polyol (e.g., glycerol, propylene glycol, and liquid polyethylene glycol, and the like), suitable mixtures thereof, and/or vegetable oils. Proper fluidity may be maintained, for example, by the use of a coating, such as lecithin, by the maintenance of the required particle size in the case of dispersion and by the use of surfactants. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars or sodium chloride. Prolonged absorption of the injectable compositions can be brought about by the use in the compositions of agents delaying absorption, for example, aluminum monostearate and gelatin.

For administration of an injectable aqueous solution, for example, the solution may be suitably buffered, if necessary, and the liquid diluent first rendered isotonic with sufficient saline or glucose. These particular aqueous solutions are especially suitable for intravenous, intramuscular, subcutaneous and intraperitoneal administration. In this connection, a sterile aqueous medium that can be employed will be known to those of skill in the art. For example, one dosage may be dissolved in 1 ml of isotonic NaCl solution and either added to 1000 ml of hypodermoclysis fluid or injected at the proposed site of infusion, (see for example, "Remington's Pharmaceutical Sciences" 15th Edition). Some variation in dosage will necessarily occur depending on the condition of the host. The person responsible for administration will, in any event, determine the appropriate dose for the individual host.

Sterile injectable solutions are prepared by incorporating the active rAAV in the required amount in the appropriate solvent with various of the other ingredients enumerated herein, as required, followed by filtered sterilization. Generally, dispersions are prepared by incorporating the various sterilized active ingredients into a sterile vehicle which contains the basic dispersion medium and the required other ingredients from those enumerated above. In the case of sterile powders for the preparation of sterile injectable solutions, the preferred methods of preparation are vacuum-drying and freeze-drying techniques which yield a powder of the active ingredient plus any additional desired ingredient from a previously sterile-filtered solution thereof.

The rAAV compositions disclosed herein may also be formulated in a neutral or salt form. Pharmaceutically-acceptable salts, include the acid addition salts (formed with the free amino groups of the protein) and which are formed with inorganic acids such as, for example, hydrochloric or phosphoric acids, or such organic acids as acetic, oxalic, tartaric, mandelic, and the like. Salts formed with the free carboxyl groups can also be derived from inorganic bases such as, for example, sodium, potassium, ammonium, calcium, or ferric hydroxides, and such organic bases as isopropylamine, trimethylamine, histidine, procaine and the like. Upon formulation, solutions will be administered in a manner compatible with the dosage formulation and in such amount as is therapeutically effective. The formulations are easily administered in a variety of dosage forms such as injectable solutions, drug-release capsules, and the like.

As used herein, "carrier" includes any and all solvents, dispersion media, vehicles, coatings, diluents, antibacterial and antifungal agents, isotonic and absorption delaying agents, buffers, carrier solutions, suspensions, colloids, and the like. The use of such media and agents for pharmaceutical active substances is well known in the art. Supplementary active ingredients can also be incorporated into the compositions. The phrase "pharmaceutically-acceptable" refers to molecular entities and compositions that do not produce an allergic or similar untoward reaction when administered to a host.

Delivery vehicles such as liposomes, nanocapsules, microparticles, microspheres, lipid particles, vesicles, and the like, may be used for the introduction of the rAAV compositions of the present invention into suitable host cells. In particular, the rAAV vector delivered components may be formulated for delivery either encapsulated in a lipid particle, a liposome, a vesicle, a nanosphere, or a nanoparticle or the like.

In addition to the methods of delivery described above, the following techniques are also contemplated as alternative methods of delivering the rAAV compositions to a host. Sonophoresis (i.e., ultrasound) has been used and described in U.S. Pat. No. 5,656,016 as a device for enhancing the rate and efficacy of drug permeation into and through the circulatory system. Other drug delivery alternatives contemplated are intraosseous injection (U.S. Pat. No. 5,779,708), microchip devices (U.S. Pat. No. 5,797,898), ophthalmic formulations, transdermal matrices (U.S. Pat. Nos. 5,770,219 and 5,783,208) and feedback-controlled delivery (U.S. Pat. No. 5,697,899).

Pharmaceutical Compositions and Administration

To prepare pharmaceutical or sterile compositions of the compositions of the present invention, including the SLC2A1-NAT nucleic acid described herein in combination with one or more of a ligand, a conjugate, a vector, a lipid, a nanoparticle, a liposome, an adjuvant or a diluent may be further admixed with a pharmaceutically acceptable carrier or excipient. See, e.g., *Remington's Pharmaceutical Sciences* and *U.S. Pharmacopeia: National Formulary*, Mack Publishing Company, Easton, PA (1984).

Formulations of therapeutic agents may be prepared by mixing with acceptable carriers, excipients, or stabilizers in the form of, e.g., lyophilized powders, slurries, aqueous solutions or suspensions (see, e.g., Hardman, et al. (2001) *Goodman and Gilman's The Pharmacological Basis of Therapeutics*, McGraw-Hill, New York, NY; Gennaro (2000) *Remington: The Science and Practice of Pharmacy*, Lippincott, Williams, and Wilkins, New York, NY; Avis, et al. (eds.) (1993) *Pharmaceutical Dosage Forms: Parenteral Medications*, Marcel Dekker, NY; Lieberman, et al. (eds.) (1990) *Pharmaceutical Dosage Forms: Tablets*, Marcel Dekker, NY; Lieberman, et al. (eds.) (1990) *Pharmaceutical Dosage Forms: Disperse Systems*, Marcel Dekker, NY; Weiner and Kotkoskie (2000) *Excipient Toxicity and Safety*, Marcel Dekker, Inc., New York, NY).

Toxicity and therapeutic efficacy of the therapeutic compositions, administered alone or in combination with another agent, can be determined by standard pharmaceutical procedures in cell cultures or experimental animals, e.g., for determining the $LD_{50}$ (the dose lethal to 50% of the population) and the $ED_{50}$ (the dose therapeutically effective in 50% of the population). The dose ratio between toxic and therapeutic effects is the therapeutic index ($LD_{50}/ED_{50}$). In particular aspects, therapeutic compositions exhibiting high therapeutic indices are desirable. The data obtained from these cell culture assays and animal studies can be used in formulating a range of dosage for use in human. The dosage of such compounds lies preferably within a range of circulating concentrations that include the $ED_{50}$ with little or no toxicity. The dosage may vary within this range depending upon the dosage form employed and the route of administration.

The mode of administration can vary. Suitable routes of administration include oral, rectal, transmucosal, intestinal, parenteral; intramuscular, subcutaneous, intradermal, intramedullary, intrathecal, direct intraventricular, intravenous, intraperitoneal, intranasal, intraocular, inhalation, insufflation, topical, cutaneous, transdermal, or intra-arterial.

In particular embodiments, the composition or therapeutic can be administered by an invasive route such as by injection. In further embodiments of the invention, the composition, therapeutic or pharmaceutical composition thereof, is administered intravenously, subcutaneously, intramuscularly, intraarterially, intra-articularly (e.g. in arthritis joints), intratumorally, or by inhalation, aerosol delivery. Administration by non-invasive routes (e.g., orally; for example, in a pill, capsule or tablet) is also within the scope of the present invention.

In order to overcome any issue of the pharmacological agents crossing the blood/brain barrier, intrathecal administration is a further preferred form of administration. Intrathecal administration involves injection of the drug into the spinal canal, more specifically the subarachnoid space such that it reaches the cerebrospinal fluid. This method is commonly used for spinal anesthesia, chemotherapy, and pain medication. Intrathecal administration can be performed by lumbar puncture (bolus injection) or by a port-catheter system (bolus or infusion). The catheter is most commonly inserted between the laminae of the lumbar vertebrae and the tip is threaded up the thecal space to the desired level (generally L3-L4). Intrathecal formulations most commonly use water, and saline as excipients but EDTA and lipids have been used as well.

Compositions can be administered with medical devices known in the art. For example, a pharmaceutical composition of the invention can be administered by injection with a hypodermic needle, including, e.g., a prefilled syringe or autoinjector.

The pharmaceutical compositions of the invention may also be administered with a needleless hypodermic injection device; such as the devices disclosed in U.S. Pat. Nos. 6,620,135; 6,096,002; 5,399,163; 5,383,851; 5,312,335; 5,064,413; 4,941,880; 4,790,824 or 4,596,556.

Alternately, one may administer the pharmaceutical composition in a local rather than systemic manner, for example, via injection of directly into the desired target site, often in a depot or sustained release formulation. Furthermore, one may administer the composition in a targeted drug delivery system, for example, in a liposome coated with a tissue-specific antibody, targeting, for example, the brain. The liposomes will be targeted to and taken up selectively by the desired tissue.

The administration regimen depends on several factors, including the serum or tissue turnover rate of the therapeutic composition, the level of symptoms, and the accessibility of the target cells in the biological matrix. Preferably, the administration regimen delivers sufficient therapeutic composition to effect improvement in the target disease state, while simultaneously minimizing undesired side effects. Accordingly, the amount of biologic delivered depends in part on the particular therapeutic composition and the severity of the condition being treated.

Determination of the appropriate dose is made by the clinician, e.g., using parameters or factors known or suspected in the art to affect treatment. Generally, the dose begins with an amount somewhat less than the optimum dose and it is increased by small increments thereafter until the desired or optimum effect is achieved relative to any negative side effects. Important diagnostic measures include those of symptoms of, e.g., the inflammation or level of inflammatory cytokines produced. In general, it is desirable that a biologic that will be used is derived from the same species as the animal targeted for treatment, thereby minimizing any immune response to the reagent.

As used herein, the terms "therapeutically effective amount", "therapeutically effective dose" and "effective amount" refer to an amount of a nucleic acid SLC2A1-NAT based composition of the invention that, when administered alone or in combination with an additional therapeutic agent to a cell, tissue, or subject, is effective to cause a measurable improvement in one or more symptoms of a disease or condition or the progression of such disease or condition. A therapeutically effective dose further refers to that amount of the compound sufficient to result in at least partial amelioration of symptoms, e.g., treatment, healing, prevention or amelioration of the relevant medical condition, or an increase in rate of treatment, healing, prevention or amelioration of such conditions. When applied to an individual active ingredient administered alone, a therapeutically effective dose refers to that ingredient alone. When applied to a combination, a therapeutically effective dose refers to combined amounts of the active ingredients that result in the therapeutic effect, whether administered in combination, serially or simultaneously. An effective amount of a therapeutic will result in an improvement of a diagnostic measure or parameter by at least 10%; usually by at least 20%; preferably at least about 30%; more preferably at least 40%, and most preferably by at least 50%. An effective amount can also result in an improvement in a subjective measure in cases where subjective measures are used to assess disease severity.

Kits

The present invention also provides kits comprising the components of the combinations of the invention in kit form. A kit of the present invention includes one or more components including, but not limited to, any SLC2A1-NAT nucleic acid described herein, in association with one or more additional components including, but not limited to a pharmaceutically acceptable ligand, a conjugate, a vector, a lipid, a nanoparticle, a liposome, an adjuvant, a diluent, carrier or excipient.

In one embodiment, a kit includes a SLC2A1-NAT nucleic acid, a SLC2A1-NAT nucleic acid based compound/composition of the invention or a pharmaceutical composition thereof in one container (e.g., in a sterile glass or plastic vial).

If the kit includes a pharmaceutical composition for parenteral administration to a subject, the kit can include a device for performing such administration. For example, the kit can include one or more hypodermic needles or other injection devices as discussed above.

The kit can include a package insert including information concerning the pharmaceutical compositions and dosage forms in the kit. Generally, such information aids patients and physicians in using the enclosed pharmaceutical compositions and dosage forms effectively and safely. For example, the following information regarding a combination of the invention may be supplied in the insert: pharmacokinetics, pharmacodynamics, clinical studies, efficacy parameters, indications and usage, contraindications, warnings, precautions, adverse reactions, overdosage, proper dosage and administration, how supplied, proper storage conditions, references, manufacturer/distributor information and patent information.

EXAMPLES

The present invention may be better understood by reference to the following non-limiting examples, which are presented in order to more fully illustrate the preferred embodiments of the invention. They should in no way be construed to limit the broad scope of the invention.

Example 1—Glut1 Repletion Averts Glut1 DS in a Mouse Model of the Disease

It has been demonstrated that restoring Glut1 to Glut1 DS model mice by means of an AAV9 vector harboring the Glut1 gene was remarkably effective in thwarting disease (Tang et al. 2017). Briefly, the study demonstrated that systemic delivery of an AAV9-Glut1 construct to PND3 mutant mice raised Glut1 levels, improves motor performance, mitigates the hypoglycorrhachia (low cerebrospinal fluid-CSF-glucose) characteristically observed in the disease, enhanced the ability of the brain to absorb glucose, prevented the micrencephaly (reduced brain size) typical of Glut1 DS and ameliorated the seizures that the mice suffer as a consequence of Glut1 haploinsufficiency (FIG. 1).

The study also revealed that low Glut1 levels result in a profound diminution of the brain microvasculature. This last defect was also corrected upon Glut1 repletion. Augmenting Glut1 levels at two weeks, a time point representing the early symptomatic phase of the disease remained effective, albeit not to the extent observed when treatment was initiated at PND3 (PND3=post-natal day 3). In contrast, restoring Glut1 during adulthood when the mutant mice were fully symptomatic failed to provide benefit. Nevertheless, these results showed that Glut1 repletion when effected in a timely manner could translate into an effective and reliable means of treating Glut1 DS. Restoring Glut1 levels from the intact Glut1 allele in Glut1 DS patients, by targeting a regulatory non-coding RNA is expected to have a similar effect.

Example 2—the Expression of the Glut1 Gene is Regulated by a Novel Natural Antisense Transcript In the process of testing the AAV9 constructs in human fibroblasts and while simultaneously investigating the cause of a Glut1 DS-like patient with no detectable mutations in the Glut1 coding sequence, a natural antisense transcript partially overlapping exon 1 of Glut1 and extending into the promoter region of the gene was discovered. 3'RACE experiments indicated that there are, in fact, two alternatively spliced transcripts that differ in the number of exons that each contains (FIG. 2A). Bioinformatic analysis suggested that neither transcript is capable of coding for a protein. This, combined with the size of the transcripts (greater than 200 bp) and their orientation (antisense) relative to Glut1 define them as long non-coding RNAs (lncRNAs). In keeping with the tendency of lncRNAs to be less evolutionarily conserved than protein coding genes (Marques and Ponting 2009; Johnsson et al. 2014) bioinformatic and follow-up analysis indicated that the transcripts are unique to primates and absent in mice. The larger, approximately 3.1 kb transcript was denoted Glut1-NAT1 (or SLC2A1-NAT1) and the smaller, approximately 1.1 kb one Glut1-NAT2 (or SLC2A1-NAT2).

Figure 2C:
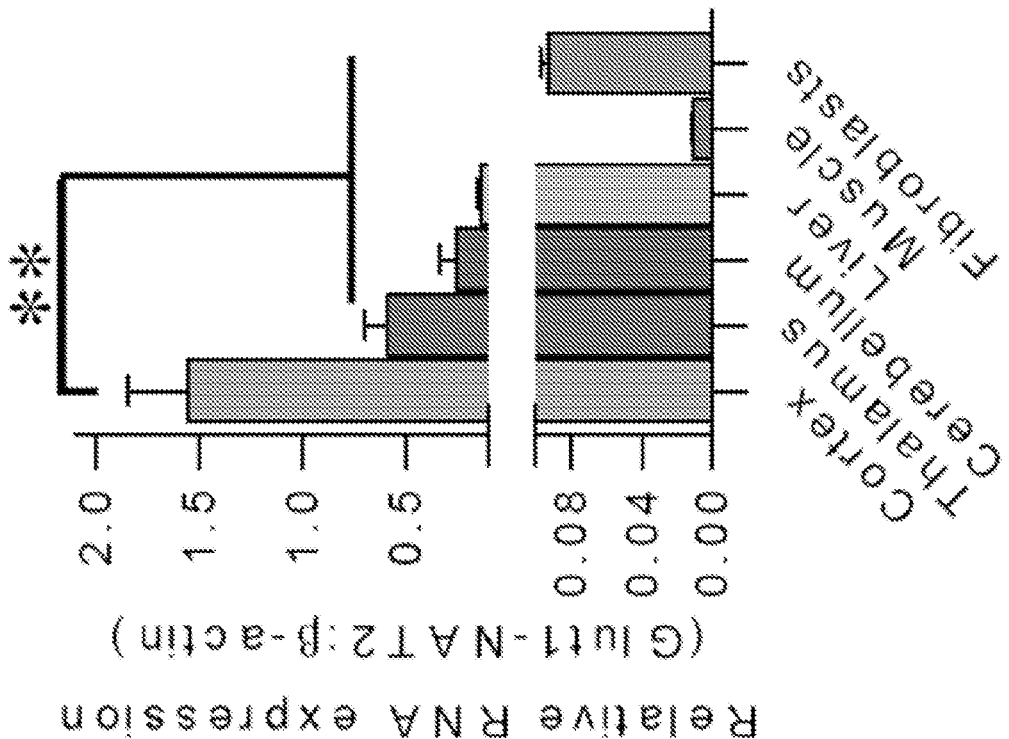
FIG. 2C shows the expression of Glut1-NAT2 in various human tissue including brain tissue.
Figure 2B:
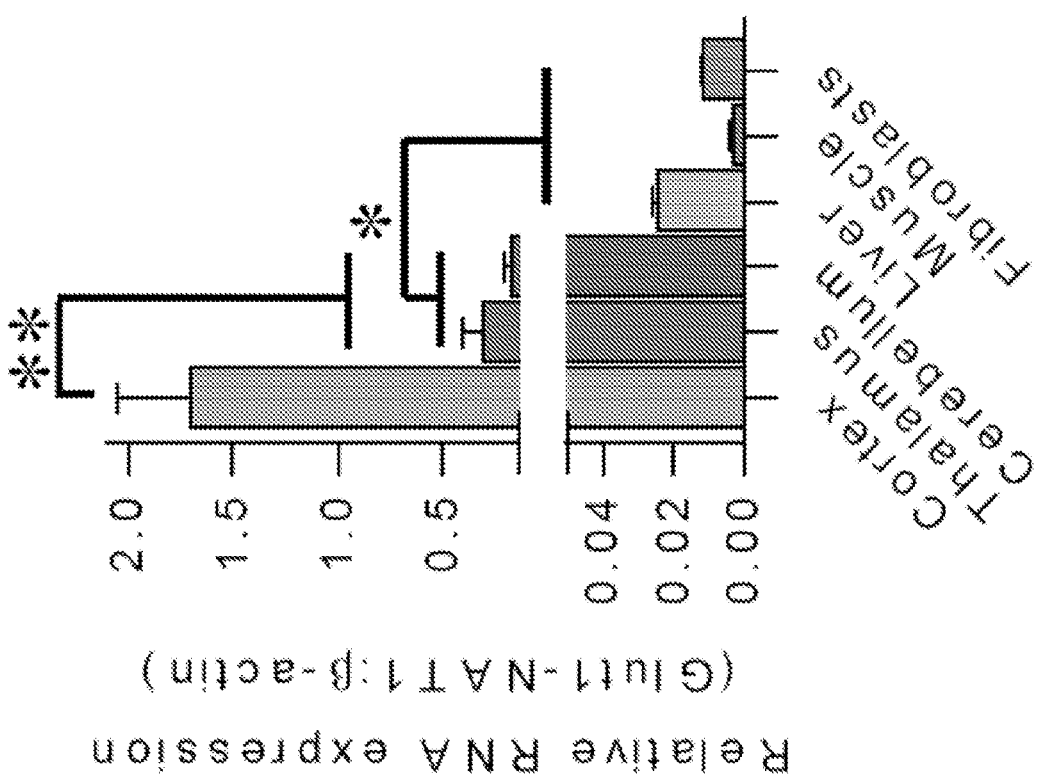
FIG. 2B shows the expression of Glut-NAT1 in various human tissue including brain tissue.
Figure 2D:
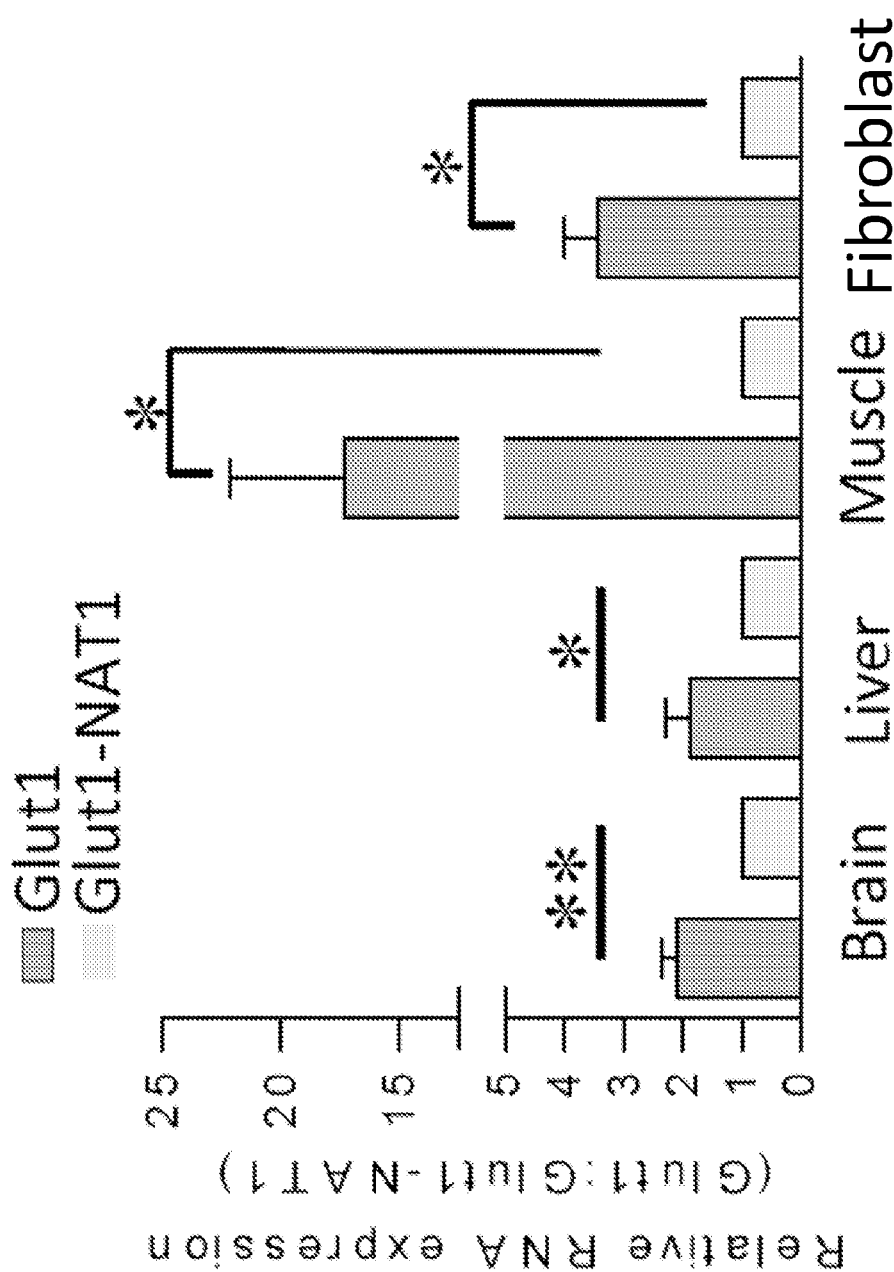
FIG. 2D shows the expression of NAT1, and the Glut1 gene in various tissues.
Figures 2E, 2F:
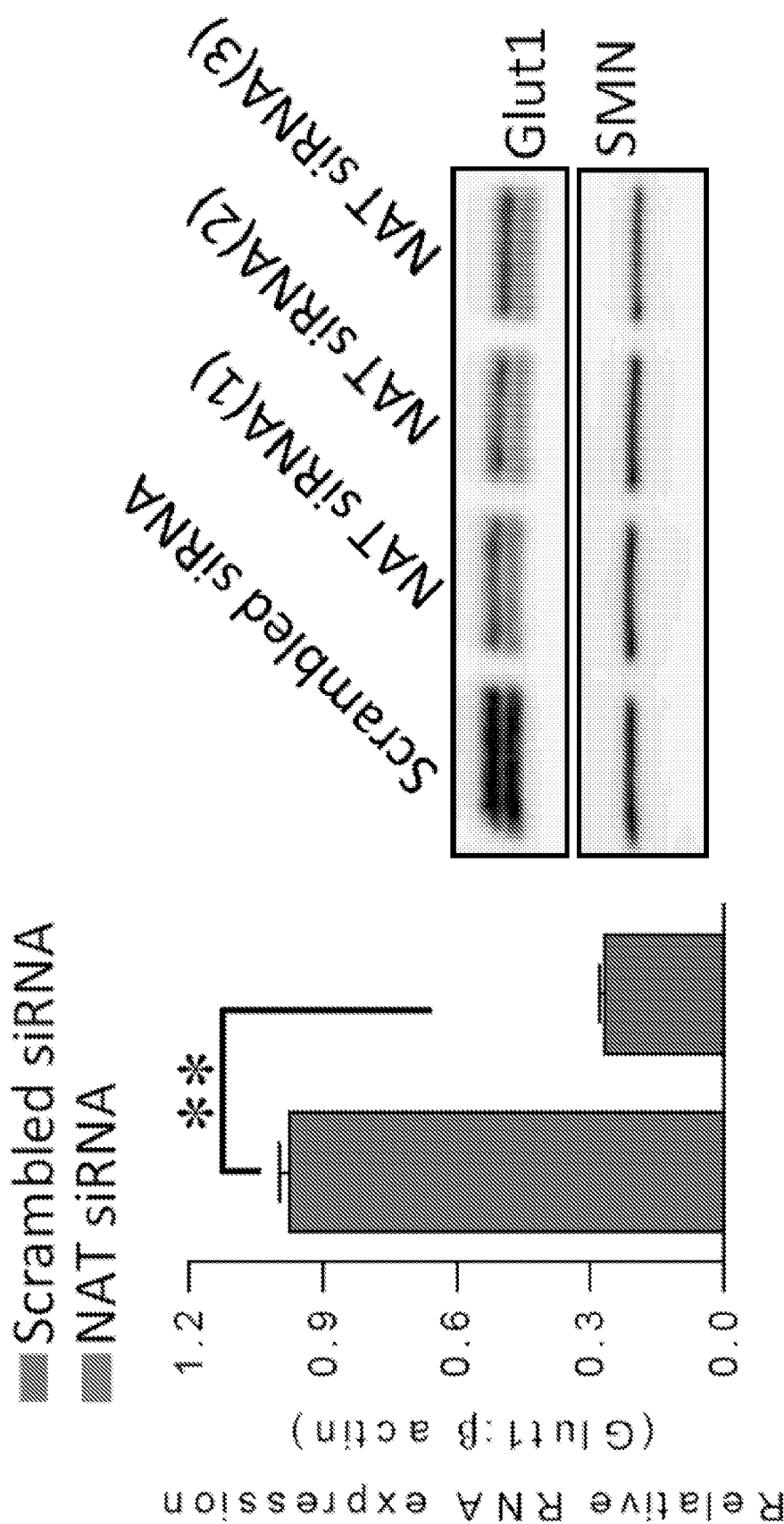
FIG. 2E is a graph showing the knockdown of the lncRNA using siRNAs common to the two isoforms results in concordant decrease of Glut1 transcript.
FIG. 2F is a Western blot showing the knockdown of the lncRNA using siRNAs common to the two isoforms results in concordant decrease of Glut1 protein. Note: The two Glut1 bands in the blots correspond to differentially glycosylated proteins. The loading control is the ubiquitously expressed SMN protein.
Figures 2G, 2H:
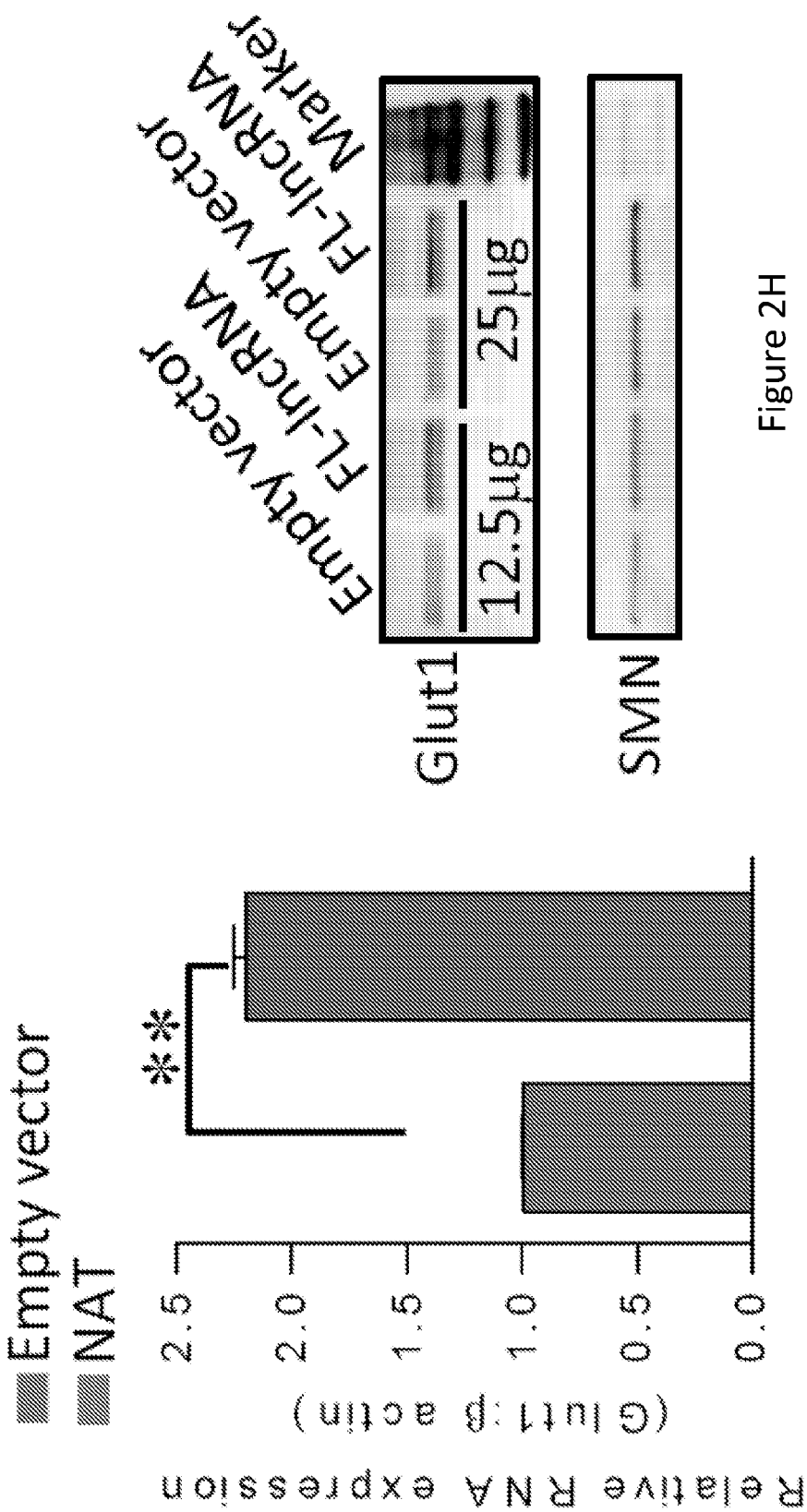
FIG. 2G is a graph showing the overexpression of the lncRNA (Glut1-NAT2) results in an increase in Glut1 transcript.
FIG. 2H is a Western blot showing the overexpression of the lncRNA (Glut1-NAT2) results in an increase in increase in Glut1 protein. Note: The two Glut1 bands in the blots correspond to differentially glycosylated proteins. The loading control is the ubiquitously expressed SMN protein.
Figure 2I:
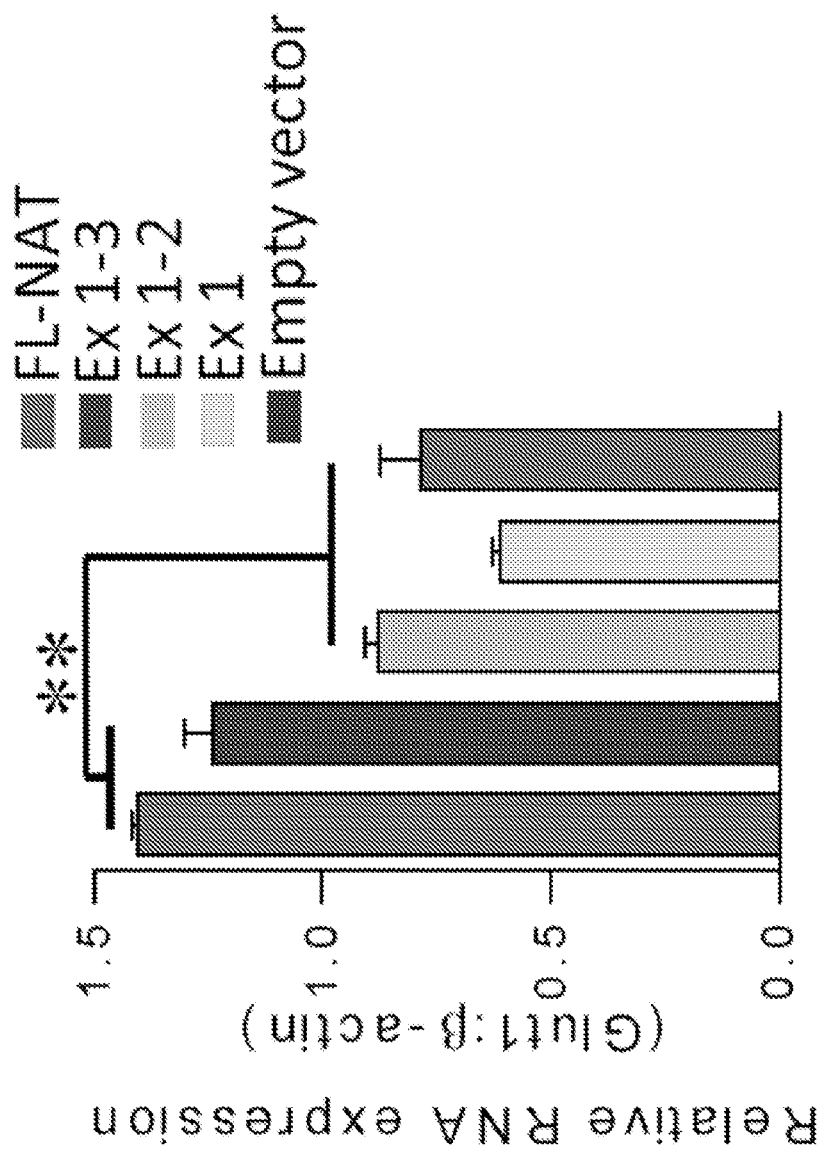
FIG. 2I is a graph of the quantification of Glut1 transcript (relative mRNA expression of Glut1 versus β-actin) following domain-specific over-expression of the lncRNA (Glut1-NAT2) showing that exons 1-3 are as efficient as the full-length (FL) transcript at enhancing Glut1 expression. Also note: *, ** $P<0.05$ and $0.01$, one-way ANOVA, n≥3 samples.

Experiments to determine the expression profiles of the NATs demonstrated that the transcripts are widely expressed but especially abundant in the cerebral cortex (FIGS. 2B and 2C). Moreover, Glut1-NAT1 was the predominant transcript, amounting to approximately 9 times as much Glut1-NAT2 in the cortex. Still, consistent with the lower abundance of lncRNAs relative to protein coding transcripts (Ravasi et al. 2006), it was found that Glut1-NAT1 is not as highly expressed as Glut1 (FIG. 2D).

Long non-coding RNAs in close proximity to genes have, in many instances, been found to regulate the expression of the genes (Orom et al. 2010; Kim et al. 2010; Broskdorrf et al. 1992). Accordingly, it was inquired if the Glut1-NATs similarly functioned to regulate Glut1. First, the effect of inhibiting the NATs was determined by using siRNAs common to both NATs. It was found that lowering NAT expression had a corresponding effect on Glut1 transcripts and protein (FIGS. 2E and 2F)—in fibroblasts as well as brain endothelial cells.

This study was extended to the effect of over-expressing Glut1-NAT2. Consistent with concordant regulation, it was found that raising Glut1-NAT2 correspondingly increased Glut1 (FIGS. 2G and 2H).

Finally, it was investigated whether the truncated versions of Glut1-NAT2 recapitulated the effect of the full-length (FL) transcript in the over-expression studies. It was found that exons 1-3 of Glut1-NAT2 were just as effective as the FL lncRNA in increasing Glut1, while exon 1 or exons 1-2 failed to yield any effect (FIG. 2I). These results revealed a novel, alternatively spliced Glut1 natural antisense transcript that concordantly regulates Glut1 in cultured cells.

Example 3—The Effects of SLCA1-lncRNA on Glut Activity

A promoter fragment containing 6 kb of the Glut1 upstream sequence was cloned into a luciferase-containing vector (pGL4.1). In parallel, exons 1-3 of the antisense transcript was closed into an expression vector. The 6 kb Glut1 promoter plasmid was then transfected into HEK-293 cells alone or with the plasmid containing the antisense transcript. The results showed, first that the 6 kb Glut1 promoter fragment was capable of driving strong luciferase expression and, second, that such expression was enhanced approximately 40% in the presence of the antisense transcript (FIG. 3). These results provided strong evidence, in vitro, that the antisense transcript was indeed able to regulate (enhance) expression from the promoter of the Glut1 gene and showed that the transcript is one novel means of augmenting Glut1 gene activity for the purpose of treating conditions such as Glut1 deficiency syndrome that result from low Glut1 levels. Additionally, the results showed that the exons 1-3 of Glut1-NAT was sufficient enough to regulate Glut1 gene expression.

Example 4—Human Glut-1 Expression was Decreased by a Knock-Down of SLC2A1 LnRNA

Figure 4:
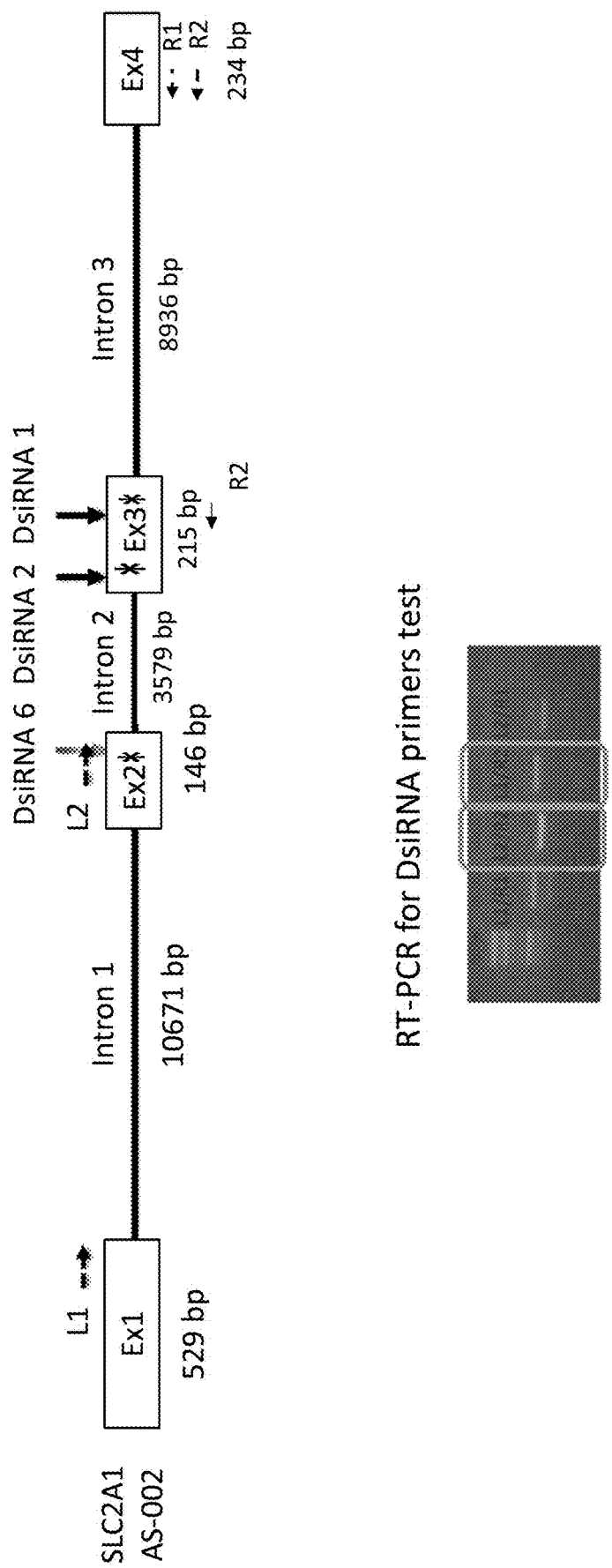
FIG. 4 shows a schematic and gel illustrating DsiRNA's design strategy targeting SLC2A1 LncRNA.

Dicer substrate interfering RNA (DsiRNA) was designed from the SLC2A1 LncRNA using the strategy shown in FIG. 4. Three DsiRNAs were generated: DS1—DsiRNA1 targeting exon 3; DS2—DsiRNA2 targeting exon 3; and DS6—DsiRNA6 targeting exon 2 of the SLC2A1 LncRNA.

The resulting DsiRNAs (10 nm) were transfected into human fibroblast cells and RNA extracted 72 hours post-transfection. qPCR was performed for the expression of SLC2A1 LncRNA and human Glut-1 on the cells transfected with each DsiRNA.

Figures 5A, 5B:
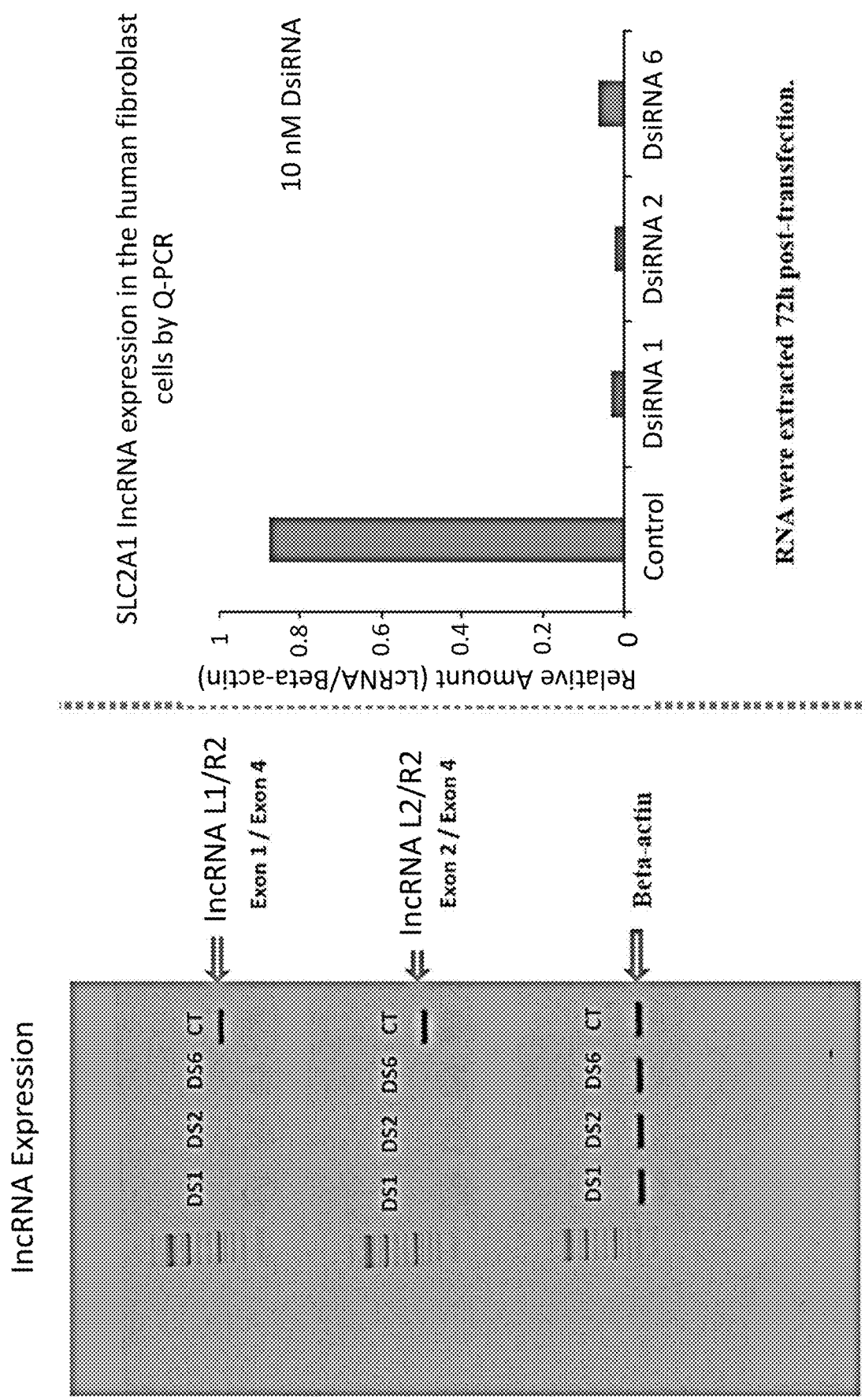
FIG. 5A are representative blots and FIG. 5B is a graph quantifying the amount of SLC2A1 RNA expression relative to a housekeeping gene (beta-actin).

As shown in FIG. 5, the expression of the SLC2A1 LncRNA was knocked down by all three of the DsiRNAs.

More interestingly, is that all of the DsiRNAs greatly decreased the expression of human Glut-1 which again provided strong in vitro evidence that SLC2A1 LncRNA was indeed able to regulate (enhance) expression of the Glut1 gene. See FIG. 6. Additionally, the results showed that the exons 2 and 3 of Glut1-NAT are responsible for regulation of Glut1 gene expression.

Example 5—Engineering a "Humanized" Glut1 Mouse

The Glut1 NAT is restricted to primates, posing a challenge to its study in rodents. The absence of a murine SMN2 gene posed a similar challenge when investigators attempted to model spinal muscular atrophy in mice, one that the inventors overcame by expressing the human SMN2 gene locus in the mice (Monani et al. 2017). The same strategy is used to generate the humanized Glut1 mouse.

A bacterial artificial chromosome (BAC) clone, RP11-125O1, which harbors the entire Glut1 genomic sequence, the Glut1 NAT and their flanking sequences has been identified. Additionally, it has been determined that an approximately 79 kb Cla1 fragment contains this entire region (FIG. 7A), offering a convenient means of extracting the human Glut1 (hGlut1) locus out of the BAC for transfer into mice. FIG. 7B depicts the isolated 79 kb fragment that contains the human hGlut1 locus. Accordingly, the fragment is injected into mouse oocytes to obtain mice transgenic for the hGlut1 gene and its associated NAT to generate the humanized Glut1 model mice. The transgene copy number and identification of the insertion site of the transgenes is assessed in the mouse as well as the expression profile of the hGlut1 gene and its associated NAT. PCR and Q-PCR on a range of tissues including the brain, neuropil, and cerebral microvasculature fraction (a site of robust Glut expression) are used to determine transcriptional activity of hGlut1 and the NAT. Additionally, an hGlut1 specific antibody is used to determine levels of expression of the hGlut1 protein in the various mouse tissues.

Example 6—Generating hGlut1$^{tg/tg}$;mGlut1$^{KO/KO}$ Model Mice

Figure 8:
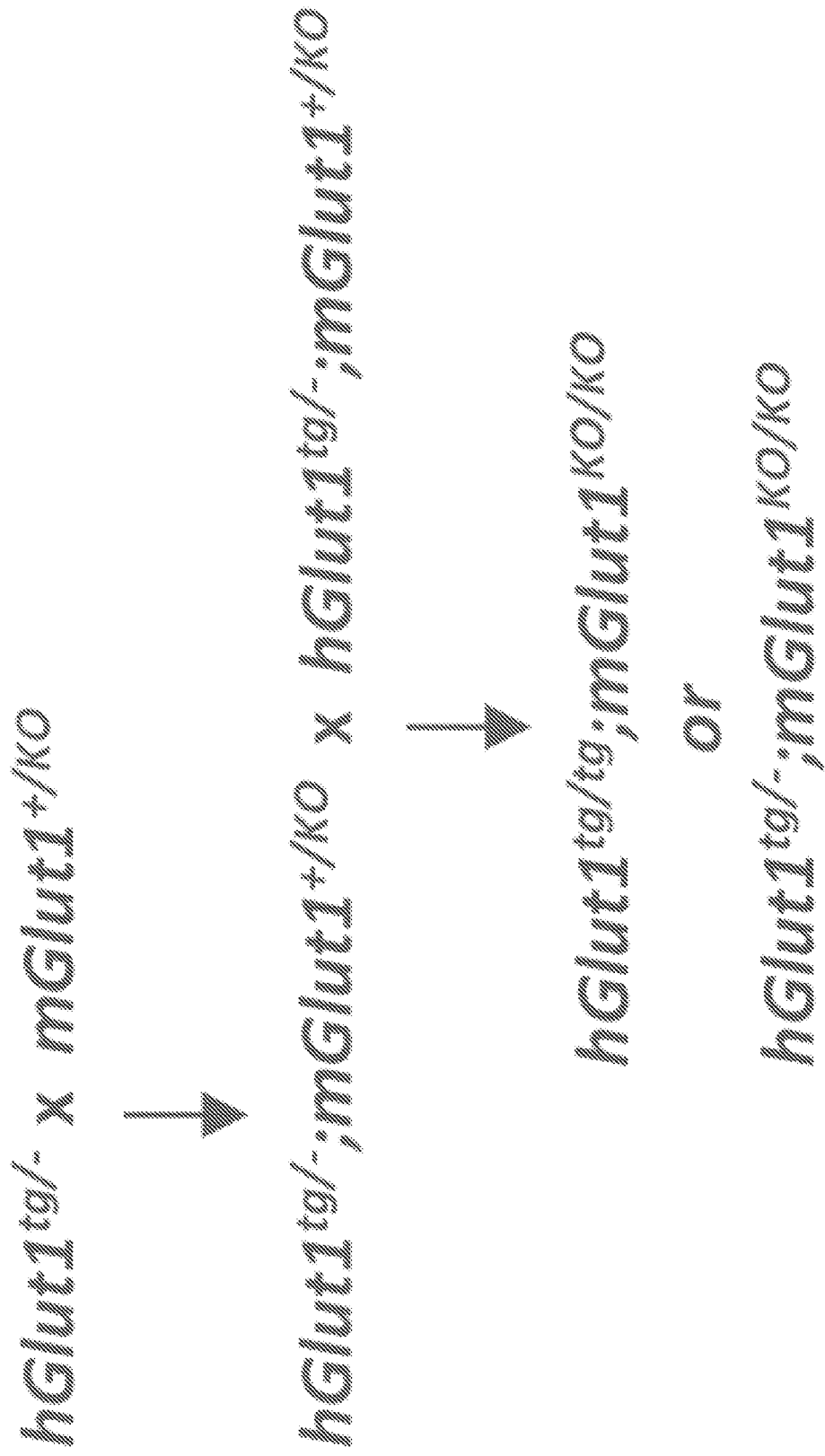
FIG. 8 is a flow diagram of the breeding protocol to obtain transgenic mice to test the effects of the Glut1-NAT on Glut1 expression in the intact organism.

After the transgenic lines expressing a single copy of the approximately 79 kb human fragment (hGlut1$^{tg/-}$) are identified, studies are performed to determine if the NAT does regulate hGlut1 expression. Model mice transgenic for the hGlut1 locus are generated using the Glut1 DS model mice previously described (Tang et al. 2017 and Wang et al. 2006), mutants heterozygous for murine Glut1 (mGlut1$^{+/KO}$), and the breeding strategy shown in FIG. 8. Identification of viable mGlut1$^{KO/KO}$ mice homozygous or hemizygous for hGlut1 in the litters immediately imply that the human transgene is functional; prior studies have demonstrated that the mGlut1$^{KO/KO}$ mutant exhibits an embryonic lethal phenotype resulting in the complete absence of viable animals with this genotype (Wang et al. 2006). These mice are assessed to determine the presence of two copies of the hGlut1 gene in the hGlut1$^{tg/tg}$;mGlut1$^{KO/KO}$ mice which renders them completely normal and then the mice are used in a detailed set of experiments to examine the effect of the NAT on hGlut1 expression in the whole organism. The experience in assessing the Glut1 DS phenotype in model mice (Tang et al. 2017) is used in ensuring that the hGlut1$^{tg/tg}$;mGlut1$^{KO/KO}$ transgenics are no different from WT animals.

Example 7—NAT Knockdown Experiments

Experiments to investigate the potential in vivo effects of the NAT on hGlut1 expression are initiated by knocking down the expression of the antisense transcript by either using antisense oligonucleotides (ASOs) or by delivering a shRNA against the transcript by means of an AAV9 vector. These reagents are systemically administered to PND3 mice, with scrambled shRNA or ASOs as negative controls.

One to two weeks later, the expression of the NAT and hGlut1 is determined and the knockdown of the NAT has a corresponding effect on hGlut1 expression and triggers a Glut1 DS disease phenotype. Briefly, the experiments are carried out on 6-8 week old mice and involve an assessment of the following parameters:

Measurements of CSF glucose—Low CSF glucose levels are a reliable and widely-accepted biomarker of Glut1 DS (DeGiorgis and Veggiotti 2013). Consequently, it is determined that CSF glucose concentrations decline in the hGlut1$^{tg/tg}$;mGlut1$^{KO/KO}$ mice following knockdown of the NAT and hGlut1 expression.

Assessing brain size—It has been demonstrated that Glut1 DS model mice have significantly smaller brains (microencephaly) than WT control littermates. Consequently, mice in which the NAT has been knockdown have this phenotypic characteristic.

Neurobehavioral outcome—Glut1 haploinsufficiency in mice compromises motor performance (Tang et al. 2017 and Wang et al. 2006). Assays to measure this will constitute a final set of experiments to assess the physiological consequences of NAT knockdown. It has been previously found deficient performance on rotarod and gait analysis tests to reliably reflect Glut1 DS in the mouse model. Both analyses show the knockdown mice have this neurobehavioral outcome.

Example 8—NAT Over-Expression Studies

In order to extend the studies examining the effects of the Glut1-NAT on hGlut1 in the whole organism, the expression of the natural antisense transcript is induced. Mice homozygous for the hGlut1 transgene but completely ablated for mGlut1 (hGlut1$^{tg/tg}$;mGlut1$^{KO/KO}$) are adequate for these experiments. However, a more appealing and informative model is one lacking mGlut1 but hemizygous for hGlut1 (hGlut1$^{tg/-}$; mGlut1$^{KO/KO}$). Such animals, like mGlut1$^{+/KO}$ mice, are expected to exhibit the signature features of Glut1 DS as they are null for mGlut1 and haploinsufficient for hGlut1. Triggering an increase in expression from the single hGlut1 allele are, in these mice, not only detected at the RNA and protein level but is also expected to have a functional effect by ameliorating, or at least mitigating the severity, of the Glut1 DS phenotype. For these studies, by means of an AAV9 construct, either the full-length Glut1-NAT2 RNA or an eGFP construct to PND3 mutants are delivered. Mice treated with either the Glut1-NAT2 or eGFP construct are assessed by subjecting them to the full battery of molecular and phenotypic assays described in the previous section.

The behavioral studies are carried out on sample sizes of 10 or more animals based on our prior experience (Tang et al. 2017). Studies involving an analysis of Glut1 and NAT expression employ at least 4 animals. Mice of both genders are be utilized to avoid gender bias. However, results are reported separately for the two. Appropriate controls are gender and age-matched littermates. Finally, to avoid unintentional bias, whenever possible, the investigator is blind to mouse genotype.

These studies confirm that Glut NAT is a novel means of regulating Glut1 expression.

REFERENCES

Arsov et al. (2012) Glucose transporter 1 deficiency in the idiopathic generalized epilepsies. *Ann Neurol* 72, 807-815.

Bélanger et al. (2011) Brain energy metabolism: focus on astrocyte-neuron metabolic cooperation. *Cell Metab.* 14:724-38

Brockdorff et al. (1992) The product of the mouse Xist gene is a 15 kb inactive X-specific transcript containing no conserved ORF and located in the nucleus. *Cell.* 71:515-26.

Brockmann (2009) The expanding phenotype of Glut1-deficiency syndrome. *Brain Dev* 31, 545-552.

De Giorgis and Veggiotti (2013) GLUT1 deficiency syndrome 2013: current state of the art. *Seizure.* 22:803-11

De Vivo et al. (1991). Defective glucose transport across the blood-brain barrier as a cause of persistent hypoglycorrhachia, seizures, and developmental delay. *N. Engl. J. Med.,* 325, 703-709.

Gao (2016) Progress and Perspectives on Targeting Nanoparticles for Brain Drug Delivery. *Acta Pharmaceutica Sinica B* 6 (4); 268-286.

Johnsson et al. (2014) Evolutionary conservation of long non-coding RNAs; sequence, structure, function. *Biochim Biophys Acta.* 1840:1063-71.

Kim et al (2010) Widespread transcription at neuronal activity-regulated enhancers. *Nature.* 465:182-7.

Klepper and Leiendecker (2013) Glut1 deficiency syndrome and novel ketogenic diets. *J Child Neurol.* 28:1045-8

Marques and Ponting (2009) Catalogues of mammalian long noncoding RNAs: modest conservation and incompleteness. *Genome Biol.* 10: R124.

Monani et al. (2000) The human centromeric survival motor neuron gene (SMN2) rescues embryonic lethality in Smn (–/–) mice and results in a mouse with spinal muscular atrophy. *Hum Mol Genet.* 9:333-9

Nagano et al. (2008) The Air noncoding RNA epigenetically silences transcription by targeting G9a to chromatin. *Science.* 322:1717-20.

Ørom et al. (2010) Long noncoding RNAs with enhancer-like function in human cells. *Cell.* 143:46-58.

Pascual and Ronen (2015) Glucose Transporter Type I Deficiency (G1D) at 25 (1990-2015): Presumptions, Facts, and the Lives of Persons With This Rare Disease. *Pediatr Neurol.* 53:379-93.

Pellerin et al. (1998) Expression of monocarboxylate transporter mRNAs in mouse brain: support for a distinct role of lactate as an energy substrate for the neonatal vs. adult brain. *Proc Natl Acad Sci USA.* 95:3990-5

Ravasi et al. (2006) Experimental validation of the regulated expression of large numbers of non-coding RNAs from the mouse genome. *Genome Res.* 16:11-9

Tang et el. (2017) Brain microvasculature defects and Glut1 deficiency syndrome averted by early repletion of the glucose transporter-1 protein. *Nat Commun.* 8:14152

Wang et al. (2006) A mouse model for Glut-1 haploinsufficiency. *Hum Mol Genet.* 15:1169-79

What is claimed is:

1. A recombinant adeno-associated virus (rAAV) vector comprising a nucleic acid comprising a SLC2A1-NAT (Solute Carrier Family 2, or Glucose transporter 1 (Glut1), natural antisense transcript) sequence consisting of the nucleotide sequence of SEQ ID NO: 1.

2. A pharmaceutical composition comprising the rAAV vector of claim 1 and one or more of a pharmaceutically acceptable excipient, ligand, a conjugate, vector, lipid, nanoparticle, liposome, carrier, adjuvant or diluent.

3. The rAAV vector of claim 1, wherein the rAAV vector further comprises a chicken Beta-actin promoter operably linked to the SLC2A1-NAT sequence and wherein the rAAV vector is capable of crossing a blood-brain barrier (BBB).

* * * * *